US011955783B2

(12) United States Patent
Cox et al.

(10) Patent No.: US 11,955,783 B2
(45) Date of Patent: Apr. 9, 2024

(54) AUTOMATED CABLE RUNNER

(71) Applicant: JPMorgan Chase Bank, N.A., New York, NY (US)

(72) Inventors: Jacob Cox, Littleton, CO (US); Robert S Newnam, Wilmington, DE (US); Sheridan Jarrett Wendt, Las Vegas, NV (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 751 days.

(21) Appl. No.: 17/026,715

(22) Filed: Sep. 21, 2020

(65) Prior Publication Data

US 2022/0094146 A1    Mar. 24, 2022

(51) Int. Cl.
*H02G 1/08*     (2006.01)
*H02G 3/04*     (2006.01)

(52) U.S. Cl.
CPC ........... *H02G 1/088* (2013.01); *H02G 3/0437* (2013.01); *H02G 1/08* (2013.01)

(58) Field of Classification Search
CPC ............ H02G 1/088; H02G 1/02; H02G 1/04; H02G 1/08; H02G 1/086; H02G 3/0437; H02G 3/04
See application file for complete search history.

(56) References Cited

U.S. PATENT DOCUMENTS

| 3,602,467 | A | * | 8/1971 | Thomas | H02G 1/08 |
| | | | | | 248/210 |
| 3,637,175 | A | * | 1/1972 | McElroy | H02G 1/08 |
| | | | | | 248/55 |
| 5,913,787 | A | * | 6/1999 | Edwards | H02G 3/18 |
| | | | | | 248/300 |
| 8,958,681 | B2 | * | 2/2015 | Ripplinger | G02B 6/475 |
| | | | | | 385/136 |
| 10,947,049 | B2 | * | 3/2021 | Andreae | B65G 19/025 |
| 11,146,047 | B2 | * | 10/2021 | King | H02G 1/081 |
| 2011/0127476 | A1 | * | 6/2011 | Ballard | H02G 3/30 |
| | | | | | 254/134.3 R |
| 2014/0191170 | A1 | * | 7/2014 | Martinez | H02G 1/085 |
| | | | | | 254/134.3 R |
| 2015/0362093 | A1 | * | 12/2015 | Henderson | H02G 1/06 |
| | | | | | 248/55 |

* cited by examiner

*Primary Examiner* — Seahee Hong
(74) *Attorney, Agent, or Firm* — Greenblum & Bernstein, P.L.C.

(57) ABSTRACT

An automated cable runner (ACR) for a cabling tray. The ACR includes a pathway, a carriage operable to travel along the pathway, a plurality of supports connectable to the pathway and connectable to the tray and configured to support the pathway over the tray, and a cable holder attached to the carriage. The carriage is operable to autonomously travel along the pathway from a desired start point to a desired end point to deploy cabling into the tray from the start point to the end point.

15 Claims, 16 Drawing Sheets

AUTOMATED CABLE RUNNER

FIELD OF THE DISCLOSURE

The disclosure relates generally to an automated cable runner and systems and methods for using an automated cable runner to deploy cabling.

BACKGROUND OF THE DISCLOSURE

Infrastructure for datacenter cabling typically exists above the floor in the form of an elongate tray, for example, arranged above existing server cabinets. Running cabling in infrastructure (e.g., overhead trays) involves pulling cabling by hand and usually requires engineers and technicians climb up and down ladders multiple times so they can slowly pull the cabling into place. This is further exacerbated when the tray is supported by (e.g., hanging from) rod supports (e.g., fully-threaded or allthread supports), requiring the individual who is running cable (e.g., cable installer) to climb/descend at each of the rod supports to cable between them. Thus, the process of running cabling in this manner is time consuming. Manually laying cabling can also put engineers and technicians at risk of injury, for example, through repetitive motions and/or falls. Thus, the manual laying of cabling can be a very time-consuming, laborious, and/or hazardous process.

The process of laying the cabling manually can also put undue stress on the new cabling that risks damaging the cabling as it is installed. Additionally, the process of laying the cabling puts existing cabling (for example, cabling already arranged in the tray) at risk of being damaged.

Furthermore, depending upon the engineer's (or technician's) ability to estimate cable lengths, cabling may be 'run short,' thus requiring the cable to be pulled out of the tray (and the process started again with a longer cable)—or the cable may be 'run long,' thus necessitating, for example, a portion of the cable to be pulled out of the tray or the cable slack to be sufficiently managed at either end of the cabling run. This shortfall of conventional approaches thus results in inefficient cabling runs and/or wasted cable.

As such, there is a need in the art for an improved approach to installing (e.g., laying, running) cabling in infrastructure.

SUMMARY OF EMBODIMENTS OF THE DISCLOSURE

Embodiments of the disclosure are directed to an automated cable runner (ACR) for a cabling tray, the ACR includes a pathway, a carriage operable to travel along the pathway, a plurality of supports connectable to the pathway and connectable to the tray and configured to support the pathway over the tray, and a cable holder attached to the carriage. The carriage is operable to autonomously travel along the pathway from a desired start point to a desired end point to deploy cabling into the tray from the start point to the end point.

In embodiments of the disclosure, the ACR further comprises an end stop attachable to the pathway at the desired end point to stop the travel of the carriage along the pathway.

In further embodiments, the carriage comprises: a drive wheel structured and arranged to contact the pathway, a motor operable to rotate the drive wheel, and a power source connected to motor.

In additional embodiments, the carriage additionally comprises one or more passive wheels structured and arranged to travel along the pathway.

In yet further embodiments, the carriage comprises: a main body, a fixed attachment arm extending from the main body on a first side of the main body, a movable attachment arm attached to the main body via a connection on a second side of the main body.

In embodiments of the disclosure, the connection is a pivot connection, and the moveable attachment arm is operable to pivot away from the main body to arrange the carriage in a pathway-connecting configuration.

In further embodiments, the connection is a releasable connection, and the moveable attachment arm is removable from the main body to arrange the carriage in a pathway-connecting configuration.

In additional embodiments, the fixed attachment arm supports a first wheel, the movable attachment arm supports a second wheel, and the first wheel and the second wheel are operable to support the carriage and travel along the pathway.

In yet further embodiments, the pathway comprises respective grooves structured and arranged for receiving the first wheel and the second wheel, respectively.

In embodiments of the disclosure, the pathway comprises an attachment slot operable to connect the plurality of supports to the pathway.

In further embodiments, the power source is supported by the movable attachment arm, and wherein the motor is supported by the main body.

In additional embodiments, the drive wheel is structured and arranged to contact an underside of the pathway, and the passive wheels are structured and arranged to contact a upper side of the pathway.

In yet further embodiments, wherein the carriage is structured and arranged to hang from the pathway and be disposed above the tray.

In embodiments of the disclosure, the cable holder comprises at least one of a cable sock, a magnetic connection, and hook and loop fastener.

In further embodiments, the carriage comprises a switch operable to cut power to the motor upon actuation.

Additional embodiments of the disclosure are directed to a method of deploying cabling in a tray using an automated cable runner (ACR) comprising a pathway, a carriage operable to travel along the pathway, a plurality of supports structured and arranged for connection to the pathway and structured and arranged for connection to the tray and configured to support the pathway over the tray, and a cabling holder attached to the carriage, wherein the carriage comprises a drive wheel structured and arranged to contact the pathway; a motor operable to rotate the drive wheel; and a power source connected to motor. The method comprises attaching the carriage to the pathway, connecting an end of a cabling to the cabling holder, powering the motor to rotate the drive wheel to drive the carriage to travel along the pathway from a desired start point to a desired end point to deploy cabling into the tray from the start point to the end point.

In embodiments of the disclosure, the method further comprises attaching the ACR to the tray via the plurality of supports.

In further embodiments, the method further comprises attaching a stop block to the pathway at the end point and actuating a switch on the carriage to cut power to the motor upon contacting the stop block.

In additional embodiments, the deploying the cabling comprises: pulling the cabling through the tray; or unspooling the cabling and depositing the cabling in the tray.

Additional embodiments of the disclosure are directed to a computing apparatus configured to implement travel control for a carriage of an automated cable runner (ACR) along the pathway of the ACR from a desired start point to a desired end point to deploy cabling into the tray from the start point to the end point. The computing apparatus comprises a processor, a memory; and a communication interface coupled to each of the processor and the memory. The processor is configured to receive a cabling deployment job request; and instruct a carriage with a cabling connected thereto to travel along the pathway from the start point to the end point to deploy the cabling in the tray to fulfill the cabling deployment job request.

The above and other aspects and advantages of the disclosure will become more readily apparent from the following description and figures, illustrating by way of example the principles of the general inventive concepts.

BRIEF DESCRIPTION OF THE DRAWINGS

These and other features of the general inventive concepts will become better understood with regard to the following description and accompanying drawings in which.

DETAILED DESCRIPTION OF THE EMBODIMENTS OF THE DISCLOSURE

Figure 1:
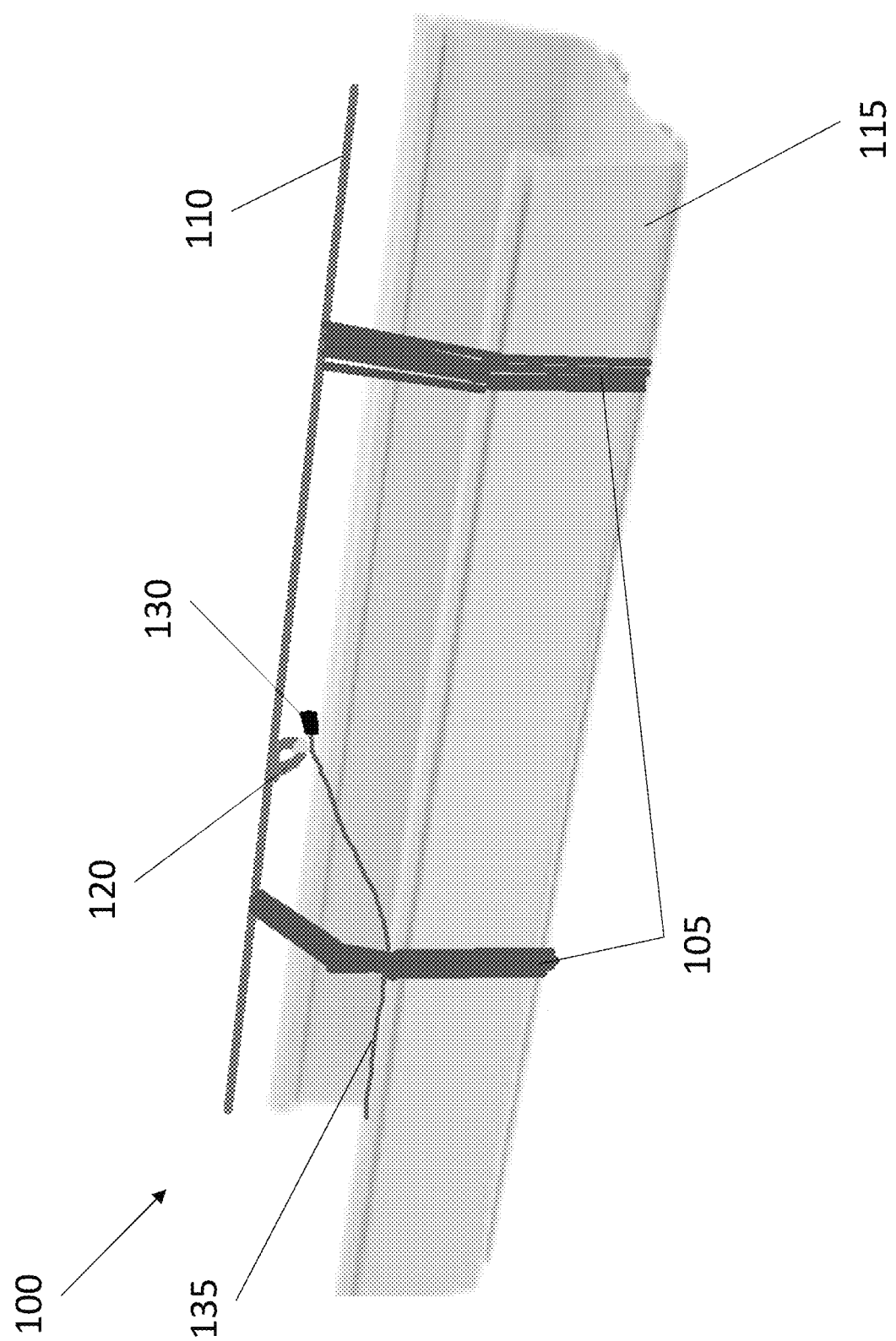
FIG. 1 shows an exemplary and non-limiting depiction of an automated cable runner (or ACR) in accordance with aspects of the disclosure.

This detailed description merely describes exemplary embodiments of the disclosure and is not intended to limit the scope of the disclosure in any way. Indeed, the contemplated disclosure is broader than the exemplary embodiments. The terms used in any claims have their full ordinary meaning unless an express definition is provided herein.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As used herein, the singular forms "a," "an," and "the" include the plural reference unless the context clearly dictates otherwise. For example, reference to "a magnetic material" would also indicate that mixtures of one or more magnetic materials can be present unless specifically excluded. As used herein, the indefinite article "a" indicates one as well as more than one and does not necessarily limit its referent noun to the singular.

Except where otherwise indicated, all numbers expressing quantities used in the specification and claims are to be understood as being modified in all examples by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

FIG. 1 shows an exemplary and non-limiting automated cable runner 100 (or ACR) in accordance with aspects of the disclosure. In embodiments, the automated cable runner 100 includes a carriage 120 operable to ride along a pathway (or track) 110 (e.g., using wheels) while retaining a free end 130 of a cabling 135 (e.g. a single cable or a bundle of cables) with a holder 140 (e.g., a tensioner). As shown in FIG. 1, the automated cable runner 100 includes a plurality of supports 105 that attach to the tray 115 and support the pathway above the tray 115. The carriage 120 is operable to pull the free end 130 of the cabling 135 (which may be, for example, dispensed from a cable spool) as the carriage 120 traverse the pathway 110 so as to lay the cabling 135 in the tray 115 (e.g., an overhead tray of a datacenter infrastructure).

As plurality of supports 105 attach to the tray 115 and support the pathway above the tray 115, in embodiments, the automated cable runner 100 can be retrofit on to, over, and/or above an existing tray (or wire basket), e.g., existing fiber and/or copper pathways. In other embodiments the tray can include an ACR 100 already installed thereon.

Figure 2:
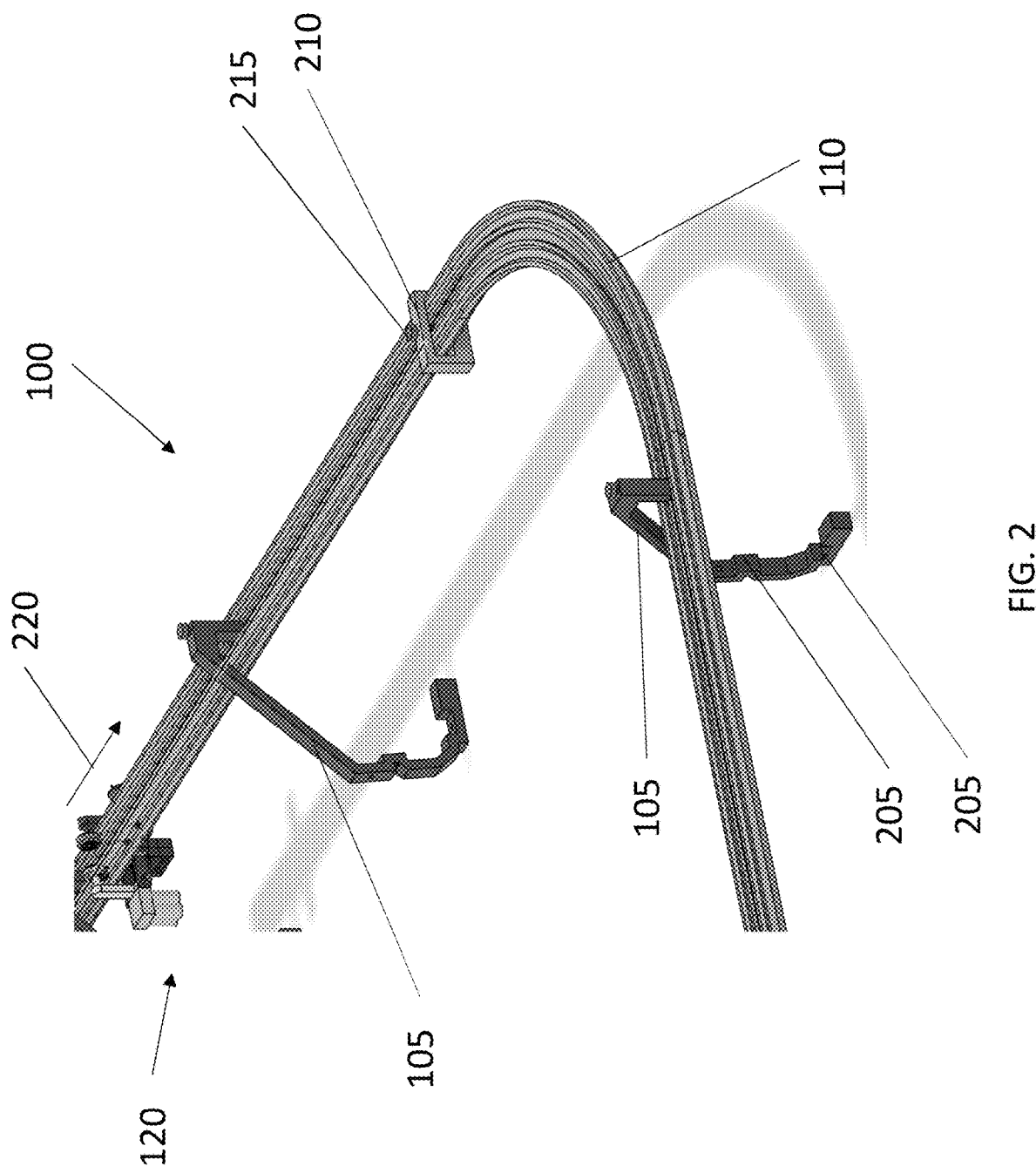
FIG. 2 shows an exemplary and non-limiting perspective view of an automated cable runner in accordance with aspects of the disclosure.

FIG. 2 shows an exemplary and non-limiting perspective view of an automated cable runner 100 (or ACR) in accordance with aspects of the disclosure. As shown in FIG. 2, the ACR includes a pathway (or track) 110 that is supported by a plurality of supports 105. As should be understood, the pathway 110 may be configurable in any path shape (including with some embodiments a single path, or with other exemplary embodiments, multiple converging and/or diverging paths). In accordance with aspects of the disclosure, each of the plurality of supports 105 include attachment structures 205 (e.g., one, two, or more attachment structures) for attachment to a cabling tray (not shown). In embodiments, the attachment structures 205 may utilize a friction fit engagement with the tray alone or in combination with other connection structures or devices (e.g., welds and/or fasteners) to secure the supports 105 to the tray so as to support the pathway 110 (and the carriage 120 thereon) above the tray (not shown).

As shown in FIG. 2, a carriage 120 is operable to traverse the pathway 110. In embodiments, the carriage 120 may include wheels that ride within channels on the pathway (or track) 110 and a driven (or driving) wheel that contacts a surface of the pathway 110 (e.g., an underside surface of the pathway) to propel the carriage 120 forward in direction 220 (e.g., in a cable deploying direction).

As shown in FIG. 2, with an exemplary embodiment, an operator can attach a stop block 210 (using a securing element 215) to the ACR pathway 110. In accordance with aspects of the disclosure, the stop block 210 serves as an obstruction that will actuate an end stop (e.g., limit switch) on the carriage 120 (as the carriage 120 contacts the stop block 210) to cut power to a motor on the ACR carriage 120 so as to suspend the forward propulsion of the carriage 120. In use, an operator can set the carriage 120 on the pathway 110 at a beginning position of the cable deployment, affix the stop block 210 at some downstream location along the pathway 110 at an ending position of the cable deployment, and set the ACR carriage 120 in motion (e.g., powering on a motor) so as to deploy the cabling between the desired beginning position and ending position. By implementing aspects of the disclosure, cabling can be deployed from a starting position without human interaction until an end of the deployment. That is, instead of climbing up and down along the entire cabling installation path, an installer may need to only climb up and down at the beginning and end points of the cabling installation path. By reducing the climbing up and down, the cabling installation process is less time-consuming, laborious, and hazardous.

Figure 3:
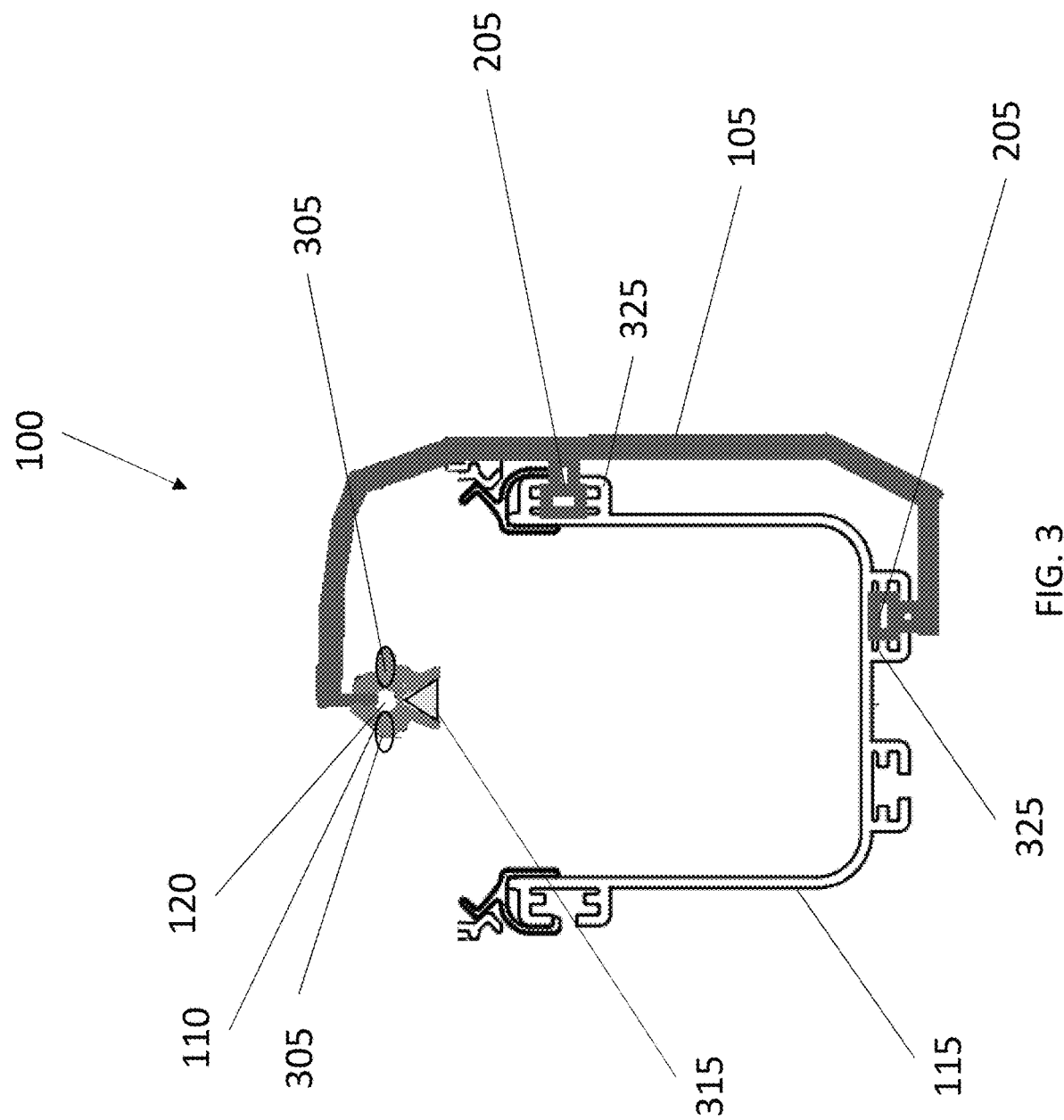
FIG. 3 shows an exemplary and non-limiting cross-sectional view of an automated cable runner in accordance with aspects of the disclosure.

FIG. 3 shows an exemplary and non-limiting cross-sectional view of an automated cable runner 100 (or ACR) in accordance with aspects of the disclosure. As shown in FIG. 3, the ACR 100 includes a pathway (or track) 110 that is supported by a plurality of supports 105 (one shown). Each support 105 includes one or more attachment structures 205 for attachment to a cabling tray 115. For example, with the depicted embodiment, the support 105 may include an upper attachment structure 205 for engagement with an upper connection structure 325 on an upper external side of the tray 115 and a lower attachment structure 205 for engagement with a lower connection structure 325 on an external bottom side of the tray 115. The attachment structure 325 may already be provided on an existing tray, and in accordance with aspects of the disclosure, the exiting attachment structure 325 is utilized to connect the supports 105 of the ACR. As shown in FIG. 3, the attachment structures 205 may utilize a friction fit engagement with the tray alone to secure the support 105 to the tray 115 so as to support the pathway 110 (and the carriage 120 thereon) above the tray 115.

As shown in FIG. 3, the automated cable runner 100 includes a carriage 120 operable to ride along the pathway (or track) 110 (e.g., using wheels 305) while retaining a free end of a cabling (not shown) with a holder (e.g., a tensioner) 315. With this exemplary and non-limiting embodiment, the wheels 305 are arranged on opposite sides of a centrally-arranged pathway 110.

Figure 4:
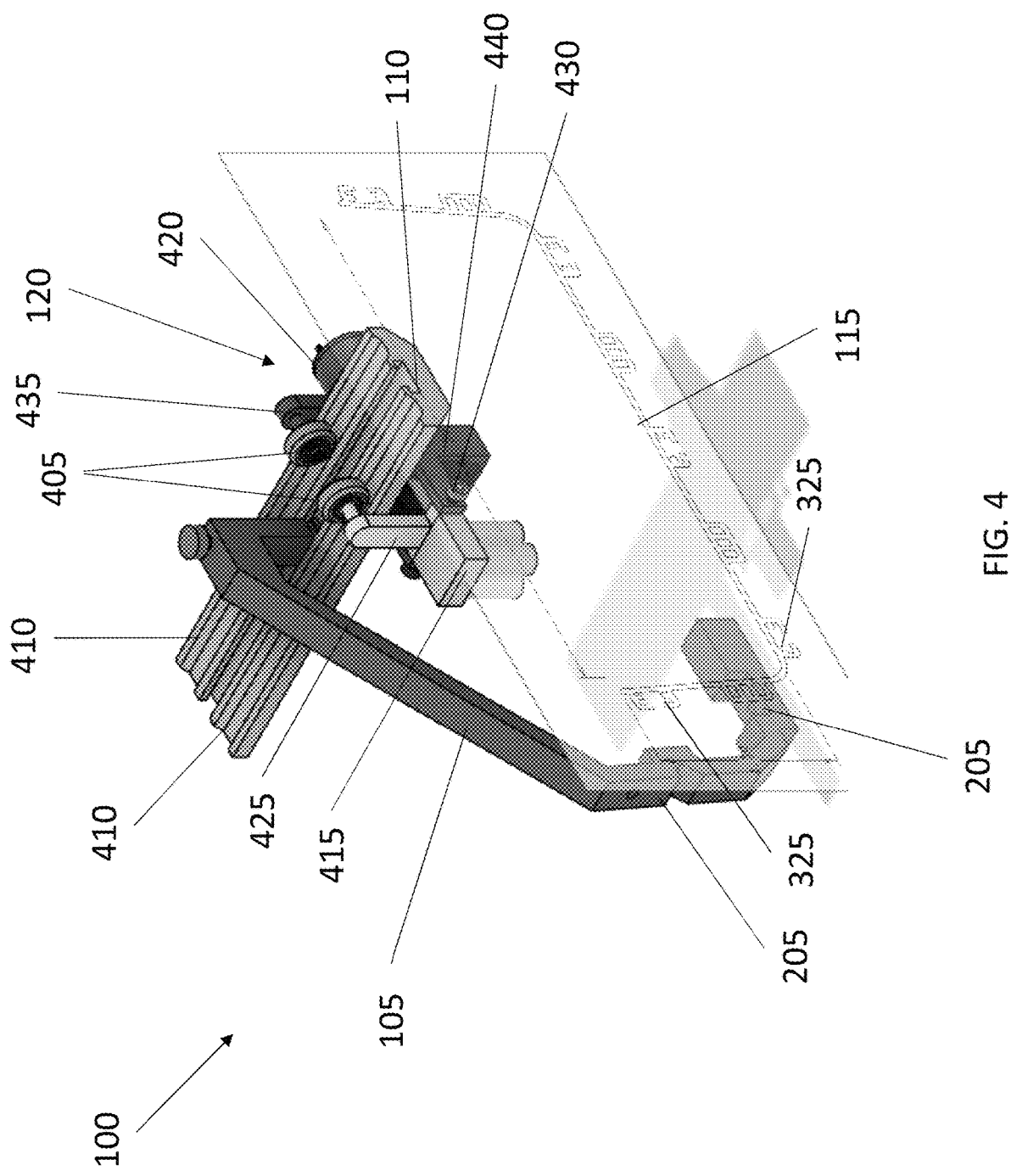
FIG. 4 shows an exemplary and non-limiting perspective view of an automated cable runner from a first side in accordance with aspects of the disclosure.

FIG. 4 shows an exemplary and non-limiting perspective view of an automated cable runner 100 (or ACR) from a first side in accordance with aspects of the disclosure. As shown in FIG. 4, the ACR 100 includes a carriage 120 operable to ride along a pathway (or track) 110 using wheels 405 while retaining a free end of a cabling (not shown) with a holder and/or tensioner (not shown). The cable holder may be attached to an underside of the main body 440. The wheels 405 of the carriage 120 are arranged to travel in respectively-arranged recesses or grooves 410 provided in the pathway 110 so as to guide the carriage 120 along the pathway 110.

As shown in FIG. 4, the automated cable runner 100 includes a plurality of supports 105 (one shown) that attach to the tray 115 via attachment structures 205 and support the pathway above the tray 115 (depicted in FIG. 4 as a planar cross section). In such a manner, in embodiments, the automated cable runner 100 can be retrofit over an existing tray (or wire basket) by utilizing the existing connection structures 325 of the tray. As should be understood, the attachment structures 205 can be differently configured (e.g., using different molds or different 3D printings) for attachment to different types of connection structures of differently configured trays 115.

As shown in FIG. 4, the exemplary carriage 120 includes a main body 440 and a fixed attachment arm 435 extending from the main body 440. The fixed attachment arm 435 rotatably supports a wheel 405 (e.g., using a ball bearing). The carriage 120 also includes a swinging attachment arm 425 attached to the main body 440 via a pivot 430. As shown in FIG. 4, the swinging attachment arm 425 rotatably supports another wheel 405 (e.g., using a ball bearing).

While not shown in FIG. 4, the main body 440 also supports a driven wheel (not shown) that is arranged for engagement with a lower surface of the pathway 110. The main body 440 includes a recess structured and arranged for retaining a motor 420 therein (and in embodiments, a gearing or transmission) for driving the driven wheel. In some embodiments, the driven wheel may include one or more springs to urge the driven wheel into contact with the lower surface of the pathway 110. As shown in FIG. 4, with this exemplary embodiment, the swinging attachment arm 425 supports a power source 415 (e.g., a battery array) used to power the motor 420.

In accordance with aspects of the disclosure, the swinging attachment arm 425 is pivotable around the pivot 430 (e.g., a connector rod) to move the wheel 405 of the swinging attachment arm 425 outwardly from the main body 440 to facilitate attachment and detachment of the carriage 120 from the pathway 110. For example, the carriage 120 may be attached to the pathway 110 by swinging a portion of the carriage (e.g., the fixed attachment arm 435) over the pathway 110 and clicking the carriage 120 into place on the pathway 110 so that the driven wheel is in contact with the lower surface of the pathway 110. Then, the swinging attachment arm 425 (with the wheel 405 attached thereto) may be swung into place to secure the carriage 120 by all three wheels to the pathway 110. With an alternative embodiment, a moveable attachment arm may be removed/placed into use by removing/inserting a bolt (e.g., threaded bolt), for example, to dis-attach/re-attach the moveable attachment arm from the carriage 120.

Figure 5:
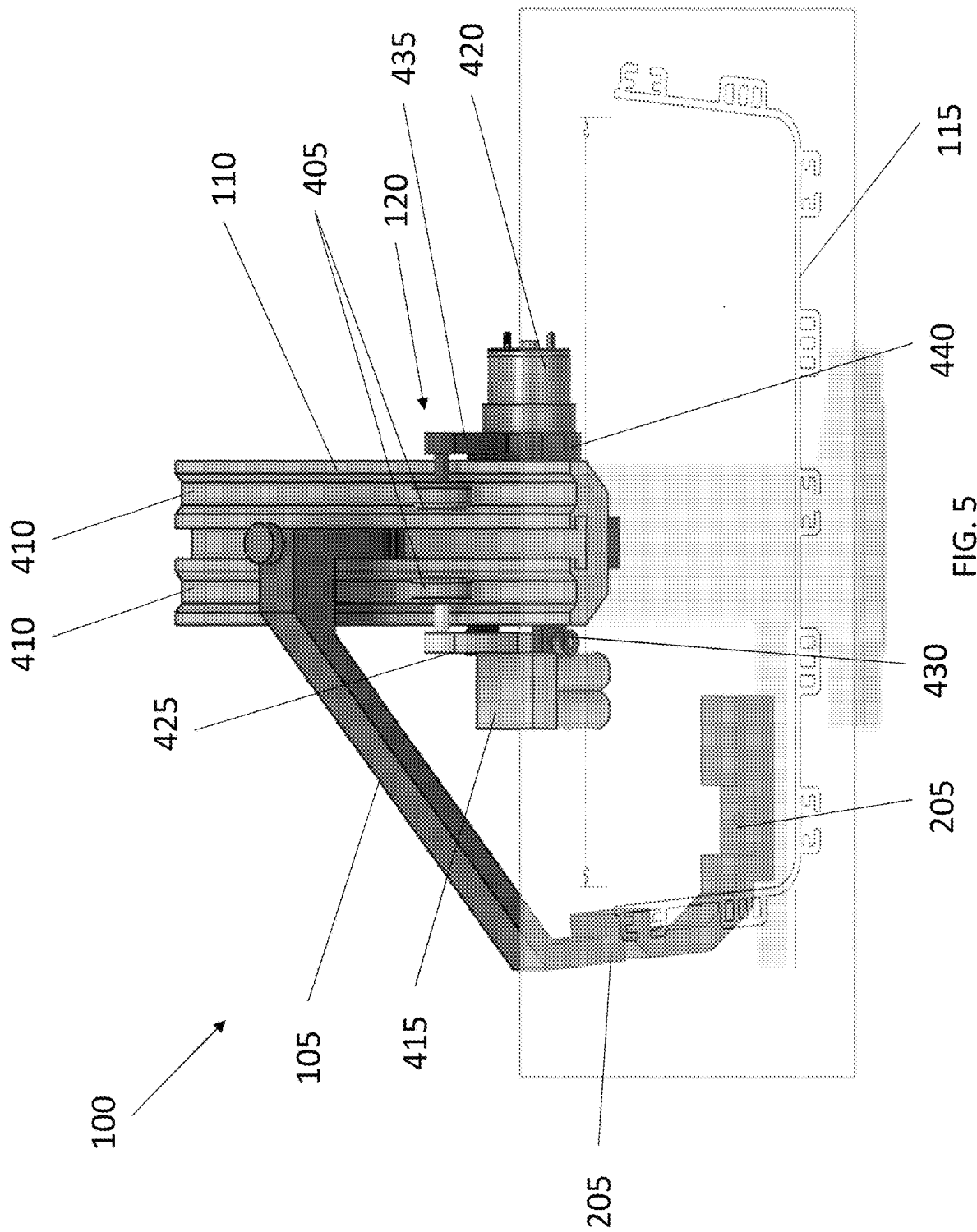
FIG. 5 shows an exemplary and non-limiting perspective view of an automated cable runner along a track direction in accordance with aspects of the disclosure.

FIG. 5 shows an exemplary and non-limiting perspective view of an automated cable runner 100 (or ACR) along a track (or pathway) direction in accordance with aspects of the disclosure. As shown in FIG. 5, the ACR 100 includes the carriage 120 operable to ride along the pathway (or track) 110 using wheels 405 while retaining a free end of a cabling (not shown) with a holder and/or tensioner (not shown). In embodiments, the holder may be attached to an underside of the carriage 120. The wheels 405 of the carriage 120 are arranged to travel in the respectively-arranged recesses or grooves 410 provided in the pathway 110 so as to guide the carriage 120 along the pathway. As shown in FIG. 5, the automated cable runner 100 includes a plurality of supports 105 (one shown) that attach to the tray 115 via attachment structures 205 and support the pathway above the tray 115 (depicted as a planar cross section in FIG. 5).

As shown in FIG. 5, the exemplary carriage 120 includes a main body 440 and a fixed attachment arm 435 extending from the main body 440. The fixed attachment arm 435 rotatably supports a wheel 405. The carriage 120 also includes the swinging attachment arm 425 attached to the main body 440 via a pivot 430. The swinging attachment arm 425 rotatably supports another wheel 405.

The main body 440 includes a recess structured and arranged for retaining a motor 420 therein for driving the driven wheel (not shown). As shown in FIG. 5, with this exemplary embodiment, the swinging attachment arm 425 supports a power source 415 (e.g., a battery array) used to power the motor 420.

Figure 6:
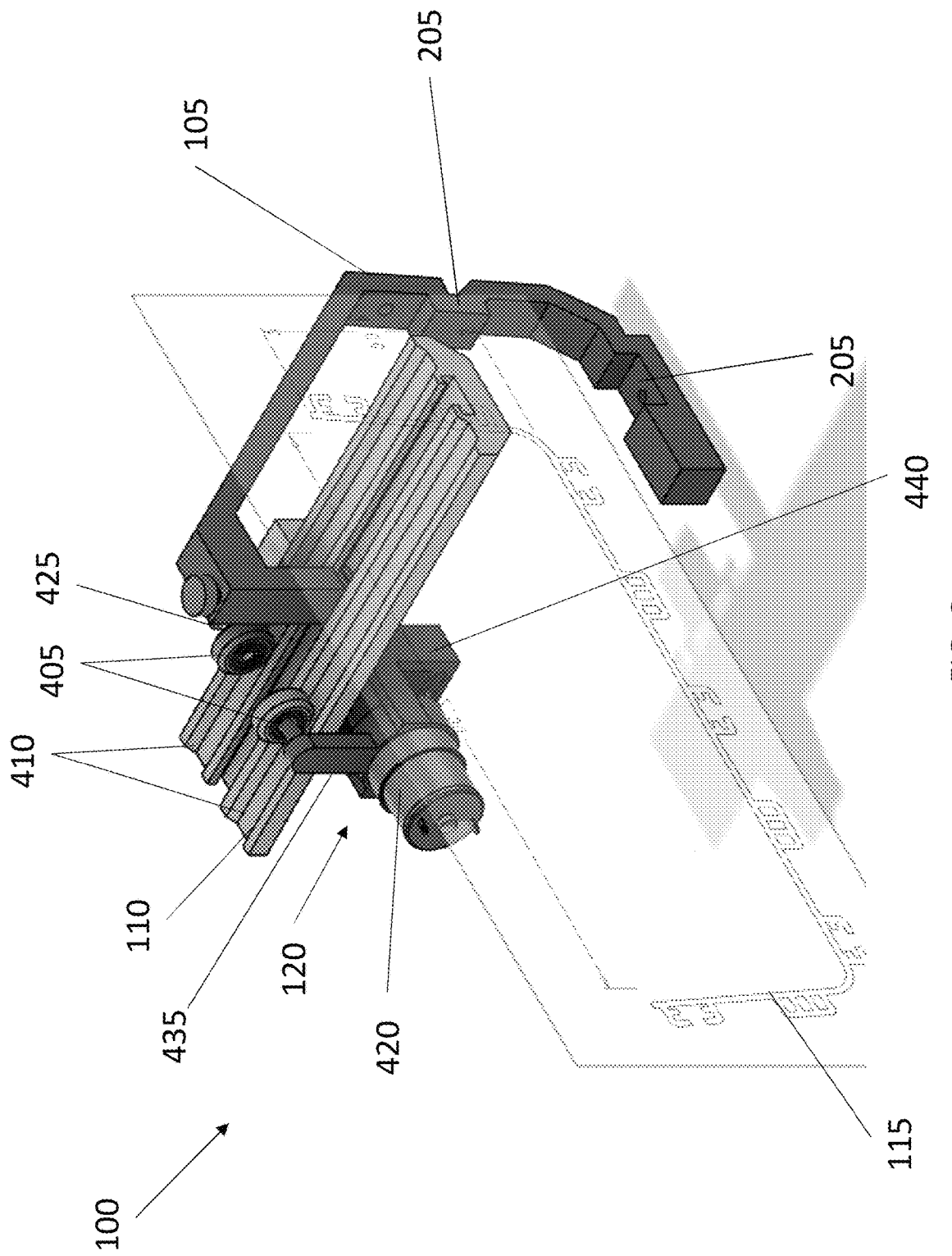
FIG. 6 shows an exemplary and non-limiting perspective view of an automated cable runner from a second side in accordance with aspects of the disclosure.

FIG. 6 shows an exemplary and non-limiting perspective view of an automated cable runner 100 (or ACR) from a second side in accordance with aspects of the disclosure. As shown in FIG. 6, the exemplary carriage 120 includes a main body 440 and a fixed attachment arm 435 extending from the main body 440. The fixed attachment arm 435 rotatably supports a wheel 405. The carriage 120 also includes the swinging attachment arm 425 with another wheel 405. The main body 440 includes a recess structured and arranged for retaining a motor 420 therein for driving the driven wheel (not shown).

Figure 7:
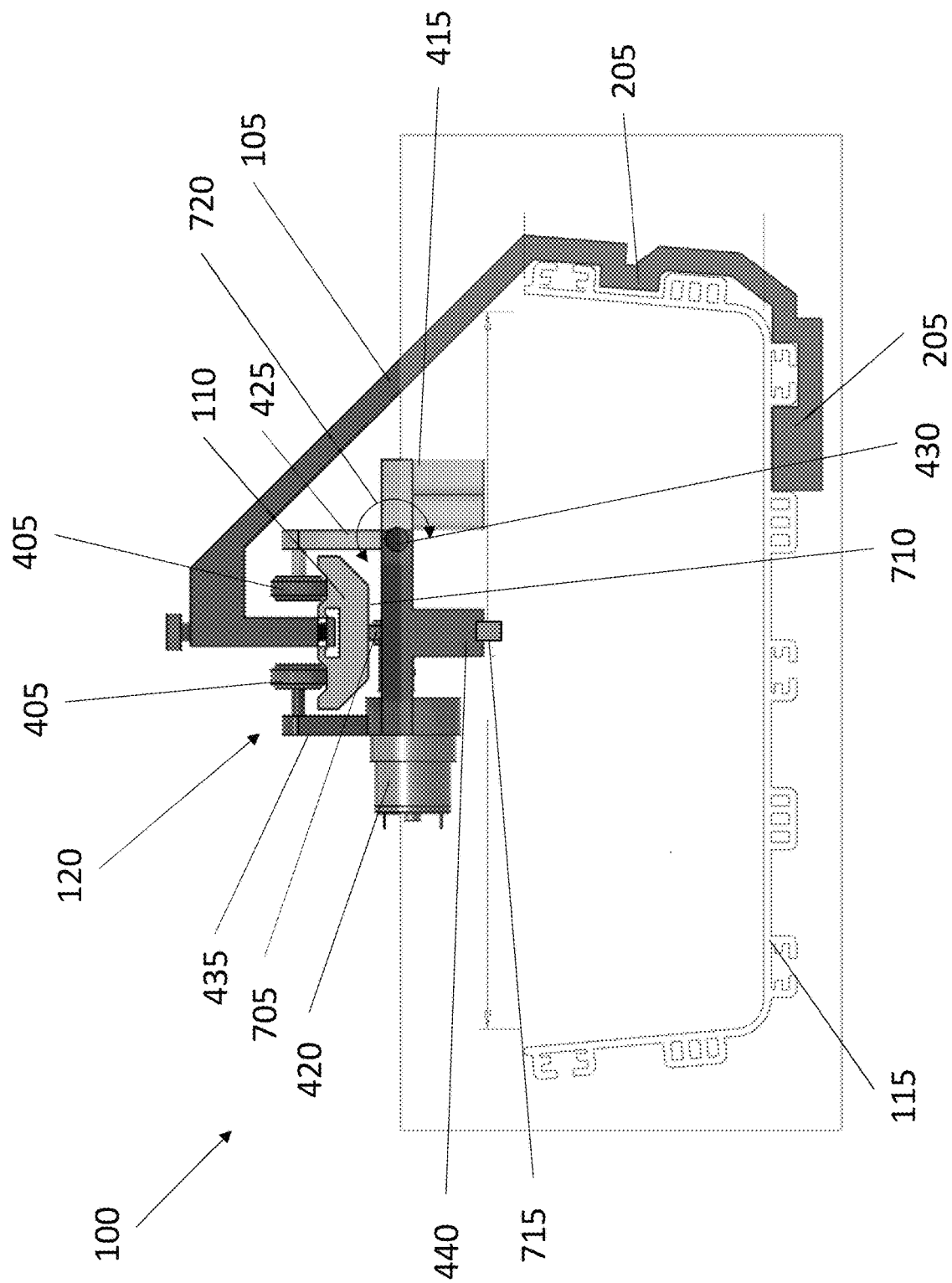
FIG. 7 shows an exemplary and non-limiting cross sectional view of an automated cable runner in accordance with aspects of the disclosure.

FIG. 7 shows an exemplary and non-limiting cross sectional view of an automated cable runner 100 (or ACR) in accordance with aspects of the disclosure. As shown in FIG. 7, the ACR 100 includes a carriage 120 operable to ride along a pathway (or track) 110 using wheels 405 while retaining a free end of a cabling (not shown) with a holder and/or tensioner 715. The wheels 405 of the carriage 120 are arranged to travel in respectively-arranged recesses or grooves 410 provided in the pathway 110 so as to guide the carriage 120 along the pathway 110.

As shown in FIG. 7, the automated cable runner 100 includes a plurality of supports 105 (one shown) that attach to the tray 115 via attachment structures 205 and support the pathway 110 above the tray 115. The exemplary carriage 120 includes a main body 440 and a fixed attachment arm 435 extending upwardly from the main body 440. The fixed attachment arm 435 rotatably supports a wheel 405. The carriage 120 also includes a swinging attachment arm 425 attached to the main body 440 via a pivot 430. As shown in FIG. 7, the swinging attachment arm 425 rotatably supports another wheel 405.

As shown in FIG. 7, the main body 440 also supports a drive wheel 705 that is arranged for engagement with a lower surface 710 of the pathway 110. The main body 440 includes a recess structured and arranged for retaining a motor 420 therein (and in embodiments, a gearing or transmission) for rotating the drive wheel 705. The drive wheel 705 may include a spring (or suspension system) to urge the drive wheel 705 into contact with the lower surface 710 of the pathway 110. As shown in FIG. 7, with this exemplary embodiment, the swinging attachment arm 425 supports a power source 415 (e.g., a battery array) used to power the motor 420 (e.g., via a wired connection there between). In accordance with aspects of the disclosure, the motor 420 and the power source 415 are arranged on opposite sides of the carriage 120 to balance the carriage 120. In accordance with further aspects of the disclosure, the motor 420 and the power source 415 are arranged on a lower side (e.g., lower half) of the carriage 120 to lower the center of gravity of the carriage 120.

In accordance with aspects of the disclosure, the swinging attachment arm 425 is pivotable around the pivot 430 (e.g., a connector rod) in a direction of arrow 720 to move the wheel 405 of the swinging attachment arm 425 outwardly from the main body 440 to facilitate attachment and detachment of the carriage 120 from the pathway 110. For example, the carriage 120 may be attached to the pathway 110 by swinging a portion of the carriage (e.g., the fixed attachment arm 435 over the pathway 110 and clicking (or popping) the carriage 120 into place on the pathway 110 (e.g., via elastic deformation of the main body 440 and/or the fixed attachment arm 435) so that the drive wheel 705 is in contact with the lower surface 710 of the pathway 110. Then, the swinging attachment arm 425 (with the wheel 405 attached thereto) may be swung in a direction of arrow 720 into place to secure the carriage 120 by all three wheels (i.e., wheels 405 and drive wheel 705) to the pathway 110. In some embodiments, the swinging attachment arm 425 may be locked into an engagement position using a locking structure (e.g., to lock the pivoting of the pivot 430). In other embodiments, once attached to the pathway 110, the swinging attachment arm 425 may be maintained in position on the pathway 110 via gravity (e.g., without a pivot-locking structure).

Figure 8:
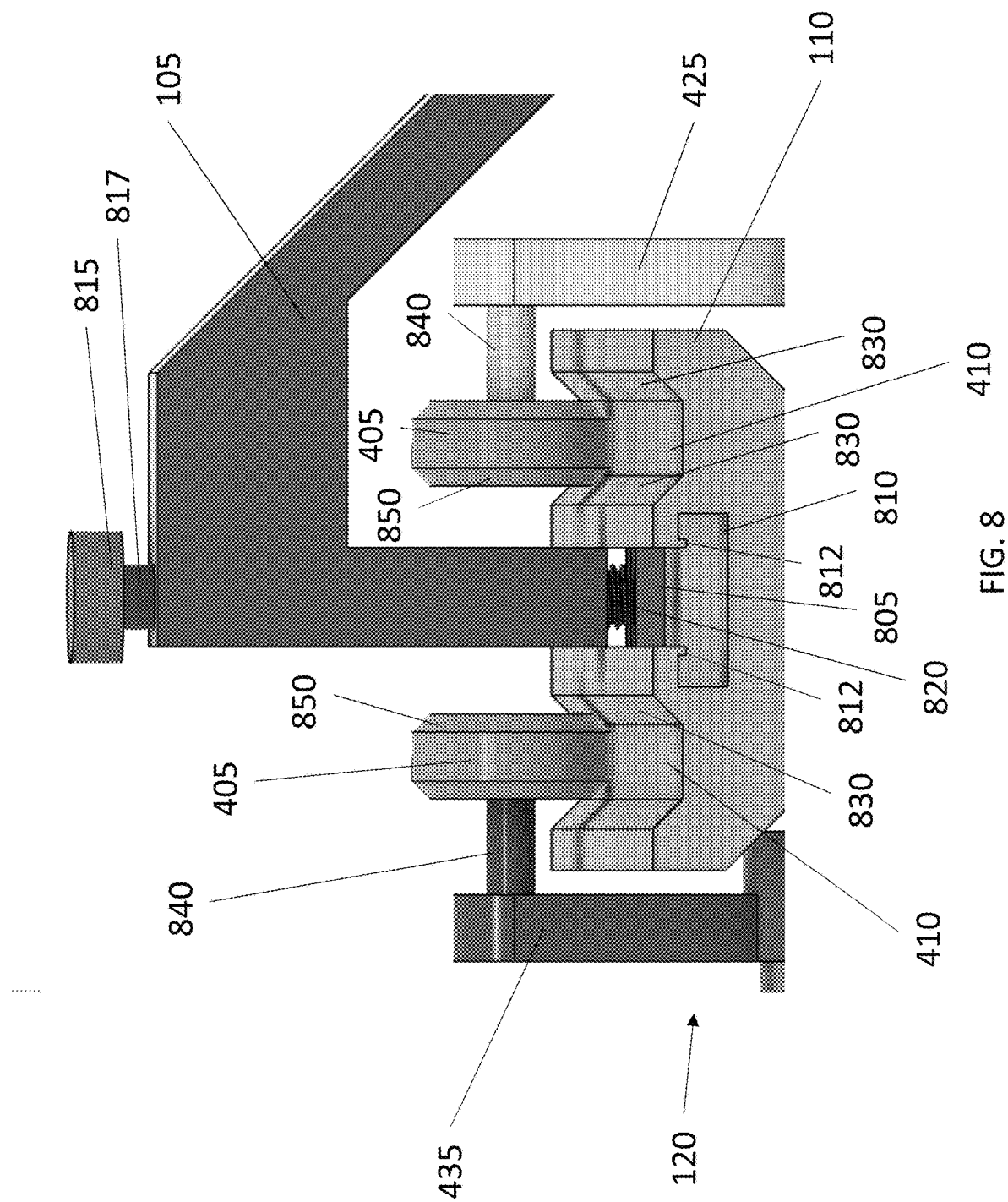
FIG. 8 shows an exemplary and non-limiting perspective close-up view of portions of an automated cable runner along a track direction in accordance with aspects of the disclosure.

FIG. 8 shows an exemplary and non-limiting perspective close-up view of portions of an automated cable runner (or ACR) along a track direction in accordance with aspects of the disclosure. As shown in FIG. 8, the automated cable runner includes a plurality of supports 105 (one shown) that attach to a tray (not shown) and support the pathway 110 above the tray. The fixed attachment arm 435 rotatably supports a wheel 405 via an extension arm (and axle) 840 and the swinging attachment arm 425 rotatably supports another wheel 405 on an extension arm (and axle) 840. The wheels 405 of the carriage 120 are arranged to travel in respectively-arranged recesses or grooves 410 provided in the pathway 110 so as to guide the carriage 120. As shown in FIG. 8, each of the recesses or grooves 410 may include angled sidewalls 830 to encourage travel of the wheels within the groove 410 (e.g., re-center the carriage 120 on the pathway 110). The wheels 405 may include tapered side walls 850 structured and arranged for engagement with the respective inner sidewalls 830 of the pathway 110 to maintain the carriage 120 in a centered position on the pathway 110.

In accordance with further aspects of the disclosure, the pathway 110 includes an attachment slot 810 arranged between the two grooves 410 and extending in a pathway direction. As shown in FIG. 8, with this exemplary embodiment, the attachment slot 810 may have a generally rectangular cross-section. Additionally, in embodiments the attachment slot 810 may include depending ridges 812 extending downwardly from inner sides of the attachment slot opening. As shown in FIG. 8, the support arm 105 includes a vertical bore (not shown) in which a rod 817 is arranged. The rod (or bolt) 817 may include a knob 815 on one axial end thereof and a threaded portion 820 on the other axial end thereof. The threaded portion 820 is arranged to engage with a securing nut 805 arranged in the attachment slot 810. By rotating the knob 815, the threaded portion 820 is engaged with the nut 805, which supports the pathway 110 (e.g., via contact with the ridges 812). In some contemplated embodiments, the pathway 110 may be secured between a lower face of the support arm 105 and an upper face of the nut 805.

Figure 9:
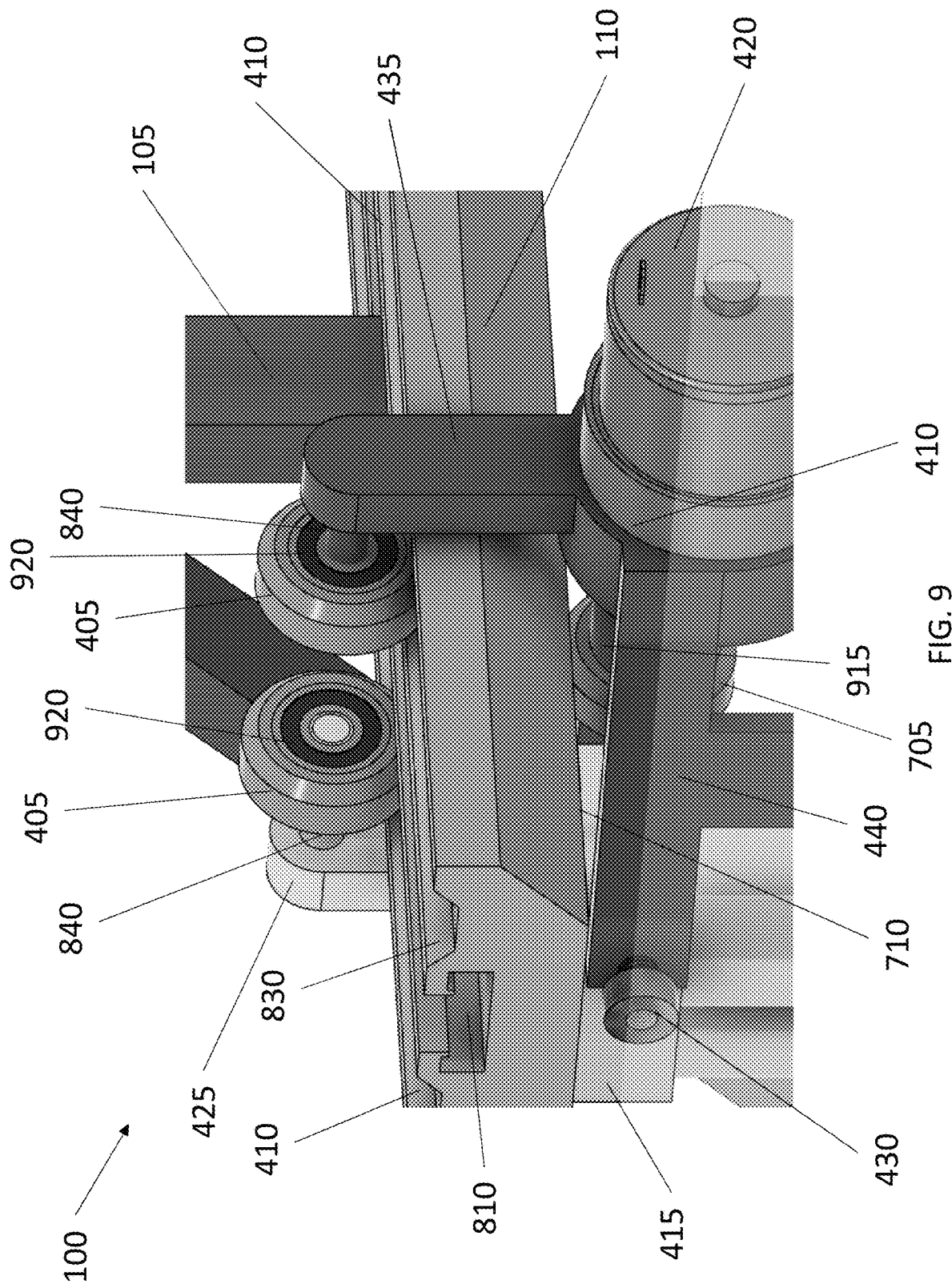
FIG. 9 shows an exemplary and non-limiting perspective close-up view of portions of an automated cable runner from a second side in accordance with aspects of the disclosure.

FIG. 9 shows an exemplary and non-limiting perspective close-up view of portions of an automated cable runner (or ACR) 100 from a second side in accordance with aspects of the disclosure. The exemplary carriage 120 includes a main body 440 (or frame) and a fixed attachment arm 435 extending upwardly from the main body 440. The carriage 120 also includes a swinging attachment arm 425 attached to the main body 440 via a pivot 430. As shown in FIG. 9, the fixed attachment arm 435 rotatably supports a wheel 405 via an extension arm and axle 840 and via a ball bearing 920, and the swinging attachment arm 425 rotatably supports another wheel 405 via an extension arm and axle 840 and a ball bearing 920.

The wheels 405 of the carriage 120 are arranged to travel in respectively-arranged recesses or grooves 410 provided in the pathway 110 so as to guide the carriage 120. As shown in FIG. 9, each of the recesses or grooves 410 may include angled sidewalls 830 to encourage travel of the wheels within the groove 410. The pathway 110 includes an attachment slot 810 that extends in a pathway direction between the two grooves 410.

As shown in FIG. 9, the main body 440 also supports a drive wheel 705 that is arranged for engagement with a lower surface 710 of the pathway 110. The main body 440 includes a recess structured and arranged for retaining a motor 420 therein (and in embodiments, a gearing or transmission 915) for rotating the drive wheel 705 at an appropriate speed and/or torque. In some embodiments, the drive wheel 705 may include a spring (or suspension system) to urge the drive wheel 705 into contact with the lower surface 710 of the pathway 110.

Figure 10:
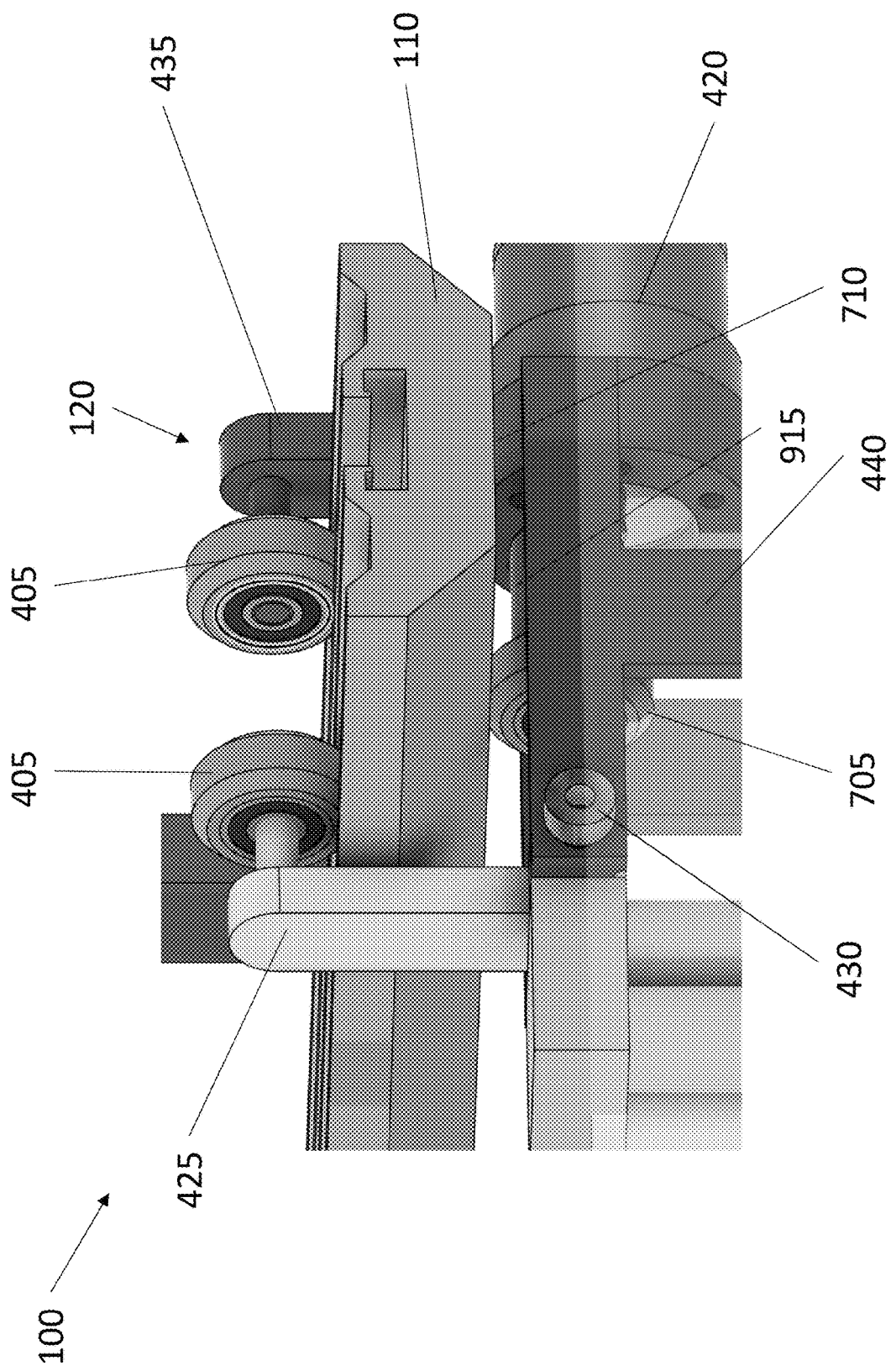
FIG. 10 shows an exemplary and non-limiting perspective close-up view of portions of an automated cable runner (or ACR) from a first side in accordance with aspects of the disclosure.

FIG. 10 shows an exemplary and non-limiting perspective close-up view of portions of an automated cable runner (or ACR) 100 from a first side in accordance with aspects of the disclosure. The exemplary carriage 120 includes a main body 440 and a fixed attachment arm 435 extending upwardly from the main body 440. The carriage 120 also includes a swinging attachment arm 425 attached to the main body 440 via a pivot 430. As shown in FIG. 10, the fixed attachment arm 435 rotatably supports a wheel 405 and the swinging attachment arm 425 rotatably supports another wheel 405.

As shown in FIG. 10, the main body 440 also supports a drive wheel 705 that is arranged for engagement with a lower surface 710 of the pathway 110. The main body 440 includes a recess structured and arranged for retaining a motor 420 therein (and in embodiments, a gearing or transmission 915) for rotating the drive wheel 705 at an appropriate speed and/or torque. In some embodiments, the drive wheel 705 may include a spring or suspension system (not shown) to urge the drive wheel 705 into contact with the lower surface 710 of the pathway 110.

Figure 11:
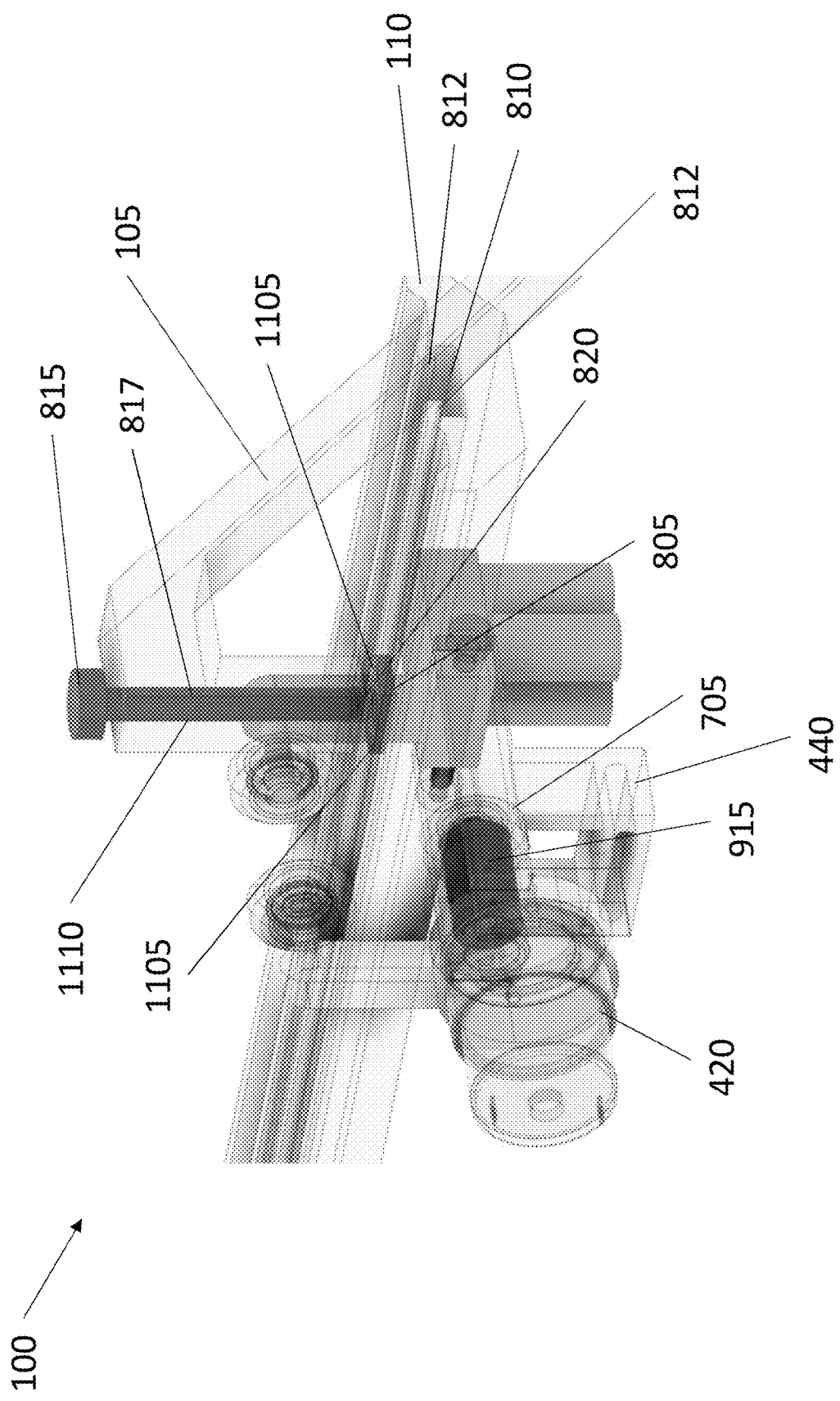
FIG. 11 shows an exemplary and non-limiting perspective view of an automated cable runner from a second side showing internally arranged components thereof in accordance with aspects of the disclosure.

FIG. 11 shows an exemplary and non-limiting perspective view of an automated cable runner (or ACR) 100 from a second side showing internally arranged components thereof in accordance with aspects of the disclosure. As shown in FIG. 11, the main body 440 houses (or accommodates) a gearing or transmission 915 arranged between the motor 420 and the drive wheel 705 for rotating the drive wheel 705 at an appropriate speed and/or torque.

In accordance with further aspects of the disclosure, the pathway 110 includes an attachment slot 810 that extends in a pathway direction between the two grooves 410. As shown in FIG. 11, with this exemplary embodiment, the attachment slot 810 may have a generally rectangular cross-section. Additionally, in embodiments the attachment slot 810 may include depending ridges 812 extending downwardly from inner sides of the attachment slot opening. As shown in FIG. 11, the support arm 105 includes a vertical bore 1110 in which a rod 817 is arranged. The rod (or bolt) 817 may include a knob 815 on one axial end thereof and a threaded portion 820 on the other axial end of the rod 817. The threaded portion 820 is arranged to engage with a securing nut 820 arranged in the attachment slot 810. By rotating the knob 815, the threaded portion 820 is engaged with the nut 805, which supports the pathway 110, for example, via contact with inner surface of the attachment slot (e.g., the ridges 812 of the attachment slot 810). In some contemplated embodiments, the pathway 110 may be secured between a lower face of the support arm 105 and an upper face of the nut 805. Additionally, as shown in FIG. 11, the nut 805 may include raised ridges 1105 at opposite sides of the nut 805 that are configured to engage with the with inner surface of the attachment slot (e.g., the ridges 812 of the attachment slot 810).

Figure 12:
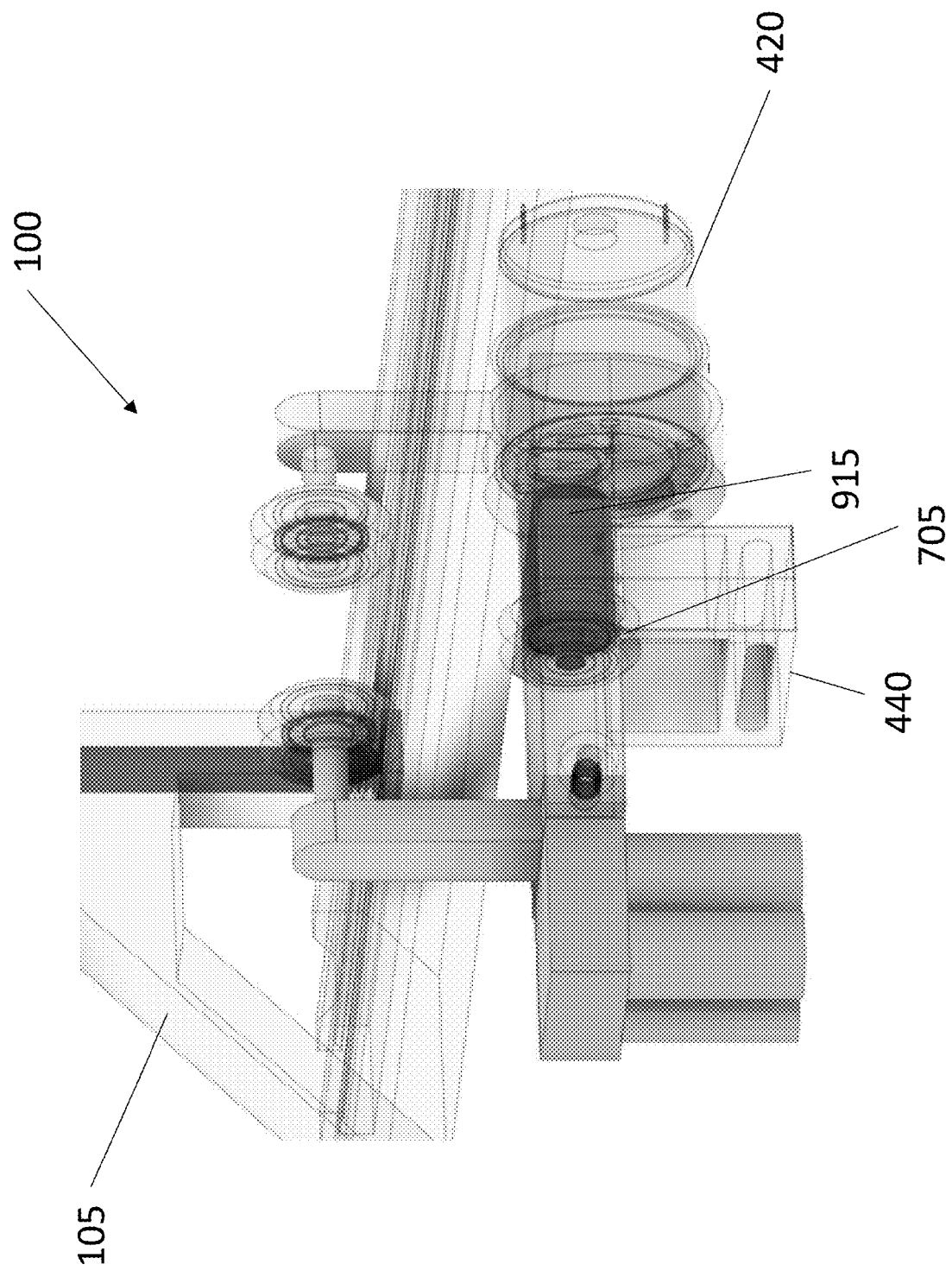
FIG. 12 shows an exemplary and non-limiting perspective view of an automated cable runner from a first side showing internally arranged components thereof in accordance with aspects of the disclosure.

FIG. 12 shows an exemplary and non-limiting perspective view of an automated cable runner (or ACR) 100 from a first side showing internally arranged components thereof in accordance with aspects of the disclosure. As shown in FIG. 12, the main body 440 houses (or accommodates) a gearing or transmission 915 arranged between the motor 420 and the drive wheel 705 for rotating the drive wheel 705 at an appropriate speed and/or torque.

Figure 13:
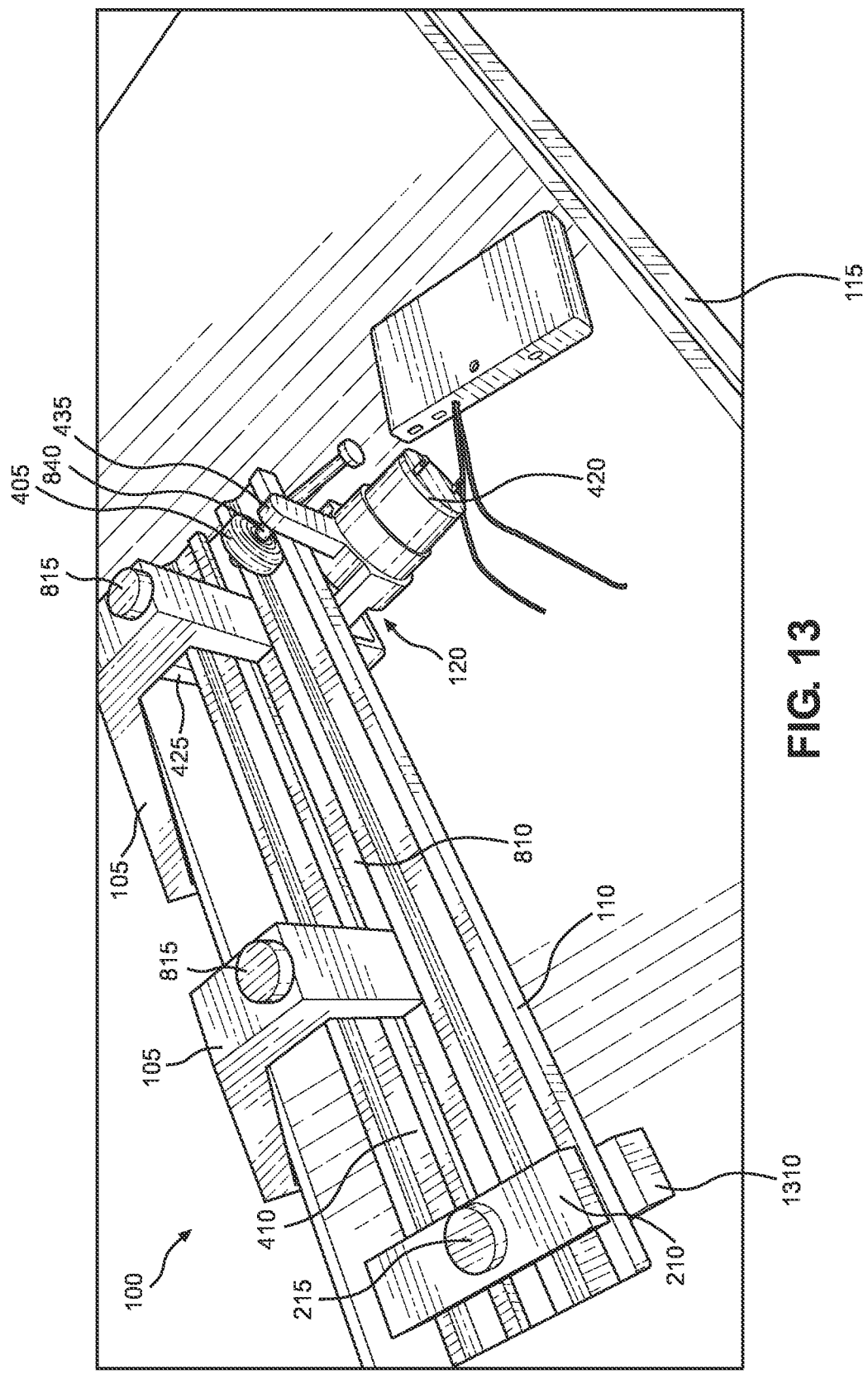
FIG. 13 shows an exemplary and non-limiting perspective view of an automated cable runner from a second side in accordance with aspects of the disclosure.

FIG. 13 shows an exemplary and non-limiting perspective view of an automated cable runner (or ACR) 100 from a second side in accordance with aspects of the disclosure. As shown in FIG. 13, the automated cable runner 100 includes a plurality of supports 105 that attach to a tray 115 and support the pathway 110 above the tray 115. The fixed attachment arm 435 rotatably supports a wheel 405 via an extension arm (and axle) 840 and the swinging attachment arm 425 rotatably supports another wheel (not shown). The wheels 405 of the carriage 120 are arranged to travel in respectively-arranged recesses or grooves 410 provided in the pathway 110 so as to guide the carriage 120.

As shown in FIG. 13, in accordance with further aspects of the disclosure, the pathway 110 includes an attachment slot 810 that extends in a pathway direction between the two grooves 410. As shown in FIG. 13, the support arms 105 each include a vertical bore (not shown) in which a rod (not shown) is arranged. The rod (or bolt) may include a knob 815 on one axial end thereof and a threaded portion (not shown) on the other axial end thereof. With an exemplary and non-limiting embodiment, the threaded portion is arranged to engage with a securing nut (not shown) arranged in the attachment slot 810. By rotating the knob 815, the threaded portion of the rod is engaged with the nut 805, which supports the pathway 110.

As shown in FIG. 13, with an exemplary embodiment, an operator can attach a stop block 210 (using a securing element 215) to the ACR pathway 110. In some embodiments, the stop block 210 may also include a lower block 1310 arranged on an underside of the pathway 110 (and attached via the threaded portion of the rod). In accordance with aspects of the disclosure, the stop block 210 (and in embodiments, the lower block 1310) serves as an obstruction that will actuate an end stop (e.g., limit switch) (not shown) on the carriage 120 to cut power to the motor 420 on the ACR carriage so as to suspend the forward propulsion of the carriage. In use, an operator can set the carriage 120 on the pathway 110 at a beginning position of the cable deployment, affix the stop block 210 (and in embodiments, the lower block 1310) at some downstream location along the pathway 110 at a desired ending position of the cable deployment, and set the ACR carriage 100 in motion (e.g., powering on the motor 420) so as to deploy the cabling (not shown) between the desired beginning position and the desired ending position.

Figure 14:
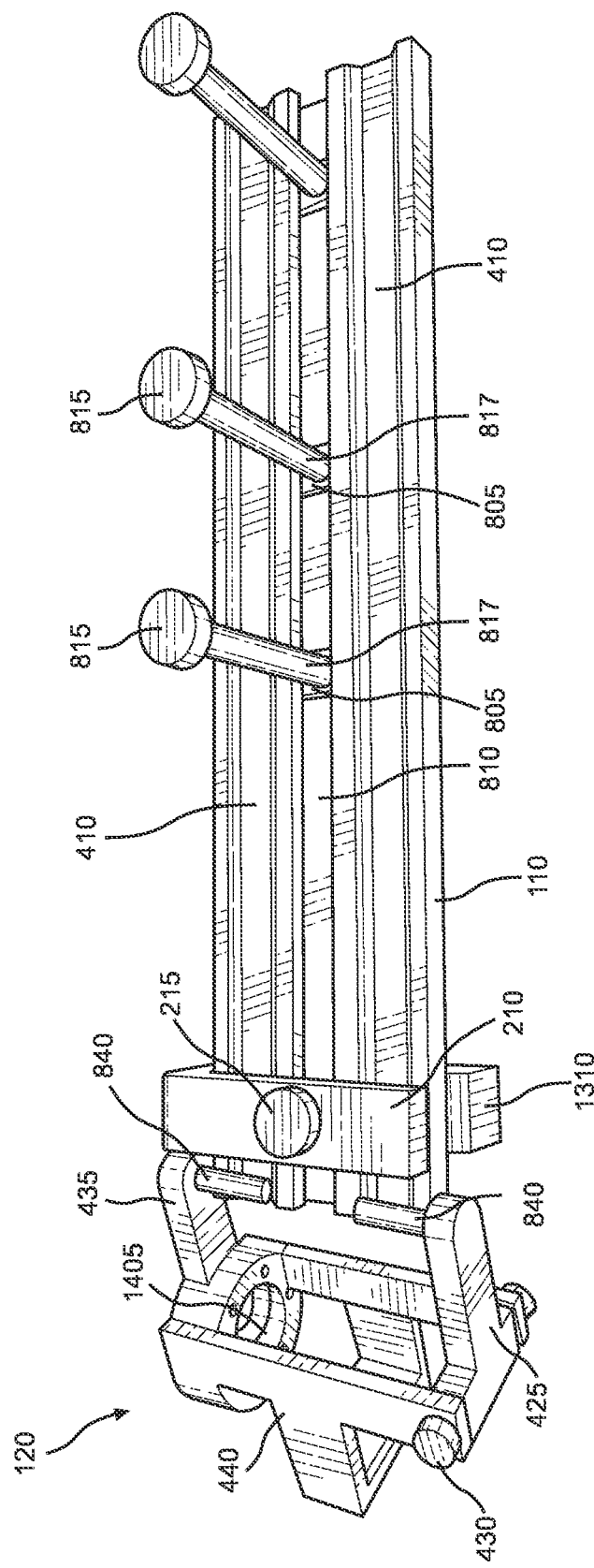
FIG. 14 shows an exemplary and non-limiting perspective view of components of an automated cable runner (or ACR) in accordance with aspects of the disclosure.

FIG. 14 shows an exemplary and non-limiting perspective view of components of an automated cable runner (or ACR) in accordance with aspects of the disclosure. As shown in FIG. 14, the exemplary carriage 120 includes a main body 440 and a fixed attachment arm 435 extending upwardly (when oriented on the pathway for travel there on) from the main body 440. The fixed attachment arm 435 rotatably supports a wheel on an axle 840. The carriage 120 also includes a swinging attachment arm 425 attached to the main body 440 via a pivot 430. As shown in FIG. 14, the swinging attachment arm 425 includes an axle (or shaft) 840 configured to rotatably support another wheel (not shown).

As shown in FIG. 14, the main body 440 also supports a drive wheel (not shown), for example, via connection to the motor. The main body 440 includes a recess 1405 structured and arranged for retaining a motor (not shown) therein (and in embodiments, a recess for a gearing or transmission housing) for supporting and rotating the drive wheel (not shown).

In accordance with aspects of the disclosure, the swinging attachment arm 425 is pivotable around the pivot 430 (e.g., a connector rod) to move the wheel axle (or shaft) 840 of the swinging attachment arm 425 outwardly from the main body 440 to facilitate attachment and detachment of the carriage 120 from the pathway 110.

As shown in FIG. 14, in accordance with further aspects of the disclosure, the pathway 110 includes an attachment slot 810 that extends in a pathway direction between the two grooves 410. As noted above, support arms (not shown) each include a vertical bore (not shown) in which a rod 817 is arranged. The rod (or bolt) 817 may include a knob 815 on one axial end thereof and a threaded portion (not shown) on the other axial end thereof. The threaded portion is arranged to engage with a securing nut 805 arranged in the attachment slot 810. By rotating the knob 815, the threaded portion of the rod is engaged with the nut 805, which supports the pathway 110.

As shown in FIG. 14, a stop block 210 may be attached to the pathway 110 using a securing element 215. In some embodiments, the stop block 210 may also include a lower block 1310 arranged on an underside of the pathway 110 (and attached via the threaded portion of a rod of fastener 215). In accordance with aspects of the disclosure, the stop block 210 (and in embodiments, the lower block 1310) serves as an obstruction that will actuate an end stop (e.g., limit switch) (not shown) on the carriage 120 so as to suspend the forward propulsion of the carriage.

In contemplated embodiments, fiber tray solutions, or a purpose built fiber/copper pathway can be used to as a pathway for the ACR carriage 120. For example, in a first scenario, an ACR pathway or track 110 may be attached to existing fiber pathways (e.g., tray 115) and the ACR rides along the pathway or track 110 to dispense cabling.

With an exemplary embodiment, the carriage 120 includes an end stop (e.g., a limit switch) arranged on the carriage to contact (e.g., a stop block 210). With some contemplated embodiments the carriage 120 may include a limit switch or other end stop device facing each travel direction of the carriage 120. Once attached and oriented the correct direction of travel for desired cabling deployment (with the end stop on the carriage 120 facing the desired drive direction), a fiber, other cabling, a pull sock, or a pull string may be attached to the carriage 120 via an attachment structure. For example, a pull sock may be used to wrap cabling and attach a rope to it to pull fiber or other cabling.

With one exemplary and non-limiting embodiment, the attachment structure may include hook and loop fasteners.

With another exemplary embodiment, the carriage 120 may include a protrusion (e.g., on a bottom surface of the carriage 120) as an attachment structure, wherein a pull sock may be slid over the protrusion to retain the pull sock thereon. With yet another exemplary embodiment, the attachment structure may include a magnetic connection system (e.g., a selectively actuable magnetic connection system). With further embodiments, the attachment structure may include a wedge and/or a tensioner.

Once the carriage is arranged on the pathway 110 and secured thereto, to deploy the cabling, for example, an operator, may actuate an on/off switch of the motor 420 to the "on" position. In accordance with aspects of the disclosure, the carriage 120 will travel down the attached pathway 110 towards the attached stop block. During this time an operator may guide cabling (e.g., dispensed from a cable spool) safely into the tray and/or ensure there is slack for the carriage to pull into the tray. Once the internal end stop (e.g., limit switch) of the ACR carriage contacts a stop block 210 attached to the track, all propulsion power is cut to the carriage and motion stops. Once the cabling is properly deployed in the tray from a desired start point to a desired end point, the operator can remove the cabling, pull sock, or other item(s) and run the cabling from the tray into. e.g., the destination the cabinet and/or the source cabinet. The operator may then actuate the power switch of the motor to the "off" position and remove the end stop 120 from the pathway 110.

With another contemplated embodiment, once the internal end stop (e.g., limit switch) of the ACR carriage contacts a stop block 210 attached to the track, the carriage may be configured to release the cabling (e.g., via a selectively actuable magnetic attachment structure) and drop the cabling in the tray. After releasing the cabling, the carriage may be configured to reverse its course and travel back to the cable deployment starting position. (e.g., by proceeding until the internal end stop (e.g., a second limit switch) of the carriage contacts a stop block 210 attached to the track at the cable deployment starting position).

With some embodiments, the ACR 100 can be integrated with DCIM tools to automate running all cabling through an infrastructure. Data center-infrastructure management (DCIM) is the integration of information technology (IT) and facility management disciplines to centralize monitoring, management and intelligent capacity planning of a data center's critical systems. DCIM utilizes the implementation of specialized software, hardware and sensors, to enable common, real-time monitoring and management platform for all interdependent systems across IT and facility infrastructures.

In other contemplated embodiments, the carriage may be operable to navigate a pathway based on determined relative location of the carriage on the pathway. For example, the carriage may include a location determination device (e.g., GPS device, RFID sensors, etc.) to determine a relative location of the carriage along the pathways. With other exemplary embodiments, a motor on the carriage supporting use of (or having) a rotary encoder may be used to measure distances the carriage travels. The carriage may also include a communication device to communicate with a controller (e.g., a computer processor configured to receive carriage location information (e.g., in real time) and instruct the carriage to travel from a first location to a second location). The controller is operable to control the movement of the carriage along a desired pathway. With an exemplary embodiment, an operator inputs a path sheet and the ACR is operable to autonomously (or via a controller) lay all required cabling for the project. By implementing aspects of the disclosure, operators will be able to walk to the floor and guide the cabling the final feet and make connections, e.g., data center connections, in minutes rather than hours.

A 'smart system' can be configured where ACR carriages remain on tracks and park themselves out of the way to be called upon later. Operators input a required start/end destination using an interface (e.g., an application/web based or physical interface) and the tracks and ACR's could automatically make the required changes to allow travel along the pathway from an initial position (e.g., a parked position) to the deployment start destination and then to the deployment end destination. With an exemplary embodiment, this may be accomplished by powering the track system, or enabling the ACR carriage to modify the track (e.g., actuate a track switch) as the carriage travels, for example, move a lever in front of the carriage to adjust which track section is in the travel path at a track switch point where multiple divergent downstream paths are available. The system can be integrated to DCIM solutions, and support automatically moving components into place for each run on a path sheet, report required cable lengths based upon start/end locations and previous runs, etc.

In further embodiments, the ACR can be configured (e.g., with a cross-wise actuating mechanism) to support laying multiple cables, and/or lay cables at differing widths of the tray offset from a center of the track, so that all cabling does not fall into the center of the tray and the capacity of the tray may be more efficiently utilized. The carriage may also be operable to lay the cabling in a tray in a zig-zag arrangement at least through some portion of the cable deploying path (e.g., a beginning and or end of a cable deploying path) so as to provide slack to the deployed cabling.

In accordance with additional aspects of the disclosure, the ACR carriage and/or the track may be operable to automatically charge batteries of the carriage. For example, the ACR may utilize a powered section of track, and the carriage may utilize a physical connection to the track, or may charge through wireless transmission of power (e.g., inductive charging). With such embodiments, the ACR may be modified to store power and distribute power to powered sections of the track, enabling a powered track system to be utilized across a building with as little as a single outside power source being used, or relying on power from the ACR to actuate powered track sections.

In further contemplated embodiments the carriage may be operable to move to a spool storage location and attach to a free end of a cable spool for deployment of the cabling. In other contemplated embodiments, the carriage may be operable to transport a cable spool (e.g., from a spool storage location to a cable deployment start position).

In further embodiments, instead of pulling of cable, the ACR can be configured to support winding/unwinding of cable around a spool arranged on (e.g., carried by) the carriage. With exemplary embodiments, the ACR may be operable to load and unload pre-wound cassettes (or spools) of cabling through an automated system. An ACR may be configured to accommodate one spool or may be configured to accommodate multiple spools (e.g., for parallel or serial deployment). The automated system may include communication devices or identification readers (e.g., RFID readers) on the carriage operable to read identifiers (e.g., RFID chips) on the spool cassettes (for example, in order to select the desired spool (or spool cassette) for a particular cable deploying operation). Other communication devices or identification readers and identifiers that may be used for communication/data transfer include NFC (near field communication) devices, and other technologies, such as barcodes, QR codes, magnets, LEDs, etc., and the appropriate reader. With other embodiments, the spool may be passive (e.g., not operable to identify spools) and the spool loading mechanism may include an inventory/reading communication device in order to select the appropriate spool for placement on an ACR for a given task. In yet other embodiments, an operator may select and load spool(s) onto the ACR.

With this winding/unwinding of cable around a spool approach, instead of pulling the cable though the tray, the cabling is unspooled and laid into position in the tray (e.g., without dragging the cabling). Once a spool has been emptied, the empty spool can be re-spooled (e.g., for subsequent cabling operation). Deploying cable from a spool mounted on (or supported by) the carriage provides improvements over pulling a cable, including, for example:

1) the operator is not required to guide cabling into the tray;

2) a bend radius of sensitive cables will be protected as the cables are deployed from the spool, as once deployed, the cabling remains in place (and is not pulled along the tray);

3) a length of cabling spooled (e.g., a predetermined length) may be used to facilitate the ACR stop point instead of using a physical stop block to set the cabling deployment end position; and 4) when traveling around corners, for example, there will be no need to ensure cabling does not get pulled out of the trays (as can often occur when the cable is pulled through the tray).

While the above embodiments have been described with respect to deploying cabling, with other contemplated embodiments, the ACR 100 may also be used to remove deployed cabling from cabling trays. For example, an end of the cabling can be attached to the carriage, and the carriage is then set in motion on the pathway in a cable-removing direction to pull the cabling from the tray. With another exemplary embodiment, an end of the cabling can be attached to a spool on the carriage, and the carriage is then set in motion on the pathway in a cable removing direction while the spool is rotated (e.g., with a motor) in a spooling direction to pull the cabling from the tray.

In other contemplated embodiments, the pathway 110 may have diverging and/or converging pathway portions. For example, the track system can be modified to support more than one possible pathway using, for example, a sliding system—wherein tracks can be slid into place at any change in direction to ensure the runner follows a specific pathway (in a manner similar to how trains operate).

With another exemplary embodiment, the ACR carriage may utilize a load cell or other sensor for determining the amount of force applied to the cabling as the carriage traverses the pathway. For example, if the sensor detects a force beyond a tension threshold, the carriage is operable to reduce carriage speed and/or stop to prevent damage to cables. Additionally, a load cell or accelerometer can detect a break in the cable directly or via detecting unexpected acceleration of the carriage. A sensor may be arranged to detect when a spool is no longer unspooling (e.g., indicating an empty spool and/or a spooling error condition).

In additional embodiment, the ACR may utilize pre-programed locations and routes to traverse the cable tray to and from specific locations. For example, the ACR may leverage a combination of sensors to detect and communicate its location in accordance with its pre-programmed logic. For example, calculating distance traveled can be accomplished by measuring the number of wheel rotations (e.g., using rotary encoders, angle resolvers, stepper motors). Additionally, NFC tags on the different track sections can be used by an NFC reader on the ACR to identify the track section (for example, the type of track, such as straight, ninety-degree, etc.) Using such an arrangement, additional embodiments of the present disclosure are directed to a track auto-discovery/mapping ACR, in which the embedded tags are used to describe track section configuration (e.g., this one is a 90 degree track section, this next one is a straight track section). The ACR can be directed along the route(s) and build a map or overlay over existing DCIM systems.

In embodiments, the ACR can determine its location by receiving signals from NFC enabled transmitters mounted to the track. In an additional embodiment, the ACR can determine its location by receiving signals from RFID enabled transmitters (or other communication devices) mounted to the track. In further embodiments, the ACR may include an optical sensor, and the ACR can determine its location by scanning bar codes (or tick marks or other indication) arranged along the track sections. In yet a further embodiment, the ACR may include a magnetic sensor, and the ACR can determine its location by detecting magnets (e.g., in a patterned array) arranged along the track sections By implementing aspects of the disclosure, with a system operable to determine ACR location based on identifying the track section upon which the ACR is currently arranged, false location determinations can be avoided. For example, should the ACR become stuck (or cabling held up somehow), the ACR will no longer proceed along the track (while the wheels may continue to rotate). With an ACR location determination based on wheel rotation, when the wheels rotate without corresponding forward motion, a false location determinations can result. As the ACR location determined in dependence upon the track section upon which the ACR is currently arranged (e.g., using a static marker, such as a bar code or magnets, or element that provides feedback to the carriage, such as RFID, NFC, etc.), however, even if the wheels rotate without corresponding forward motion, false location determinations can be avoided.

In accordance with additional aspects of the disclosure, the ACR can accommodate multiple spools of cabling (e.g., a different or same type of cabling) for parallel and/or serial deployment. For example, with a parallel deployment, the ACR is operable to lay cabling from multiple spools simultaneously. In contrast, with a serial deployment, the ACR may be configured to deploy an entire first spool and then deploy a cabling from a second spool. For example, with an exemplary embodiment, the ACR may deploy an entire first spool and then stop (e.g., using a sensor or rotary encoder) to, for example, enable an operator to connect the free end of the first cable with the new end on the second spool for continued deployment. With another exemplary embodiment the ACR, upon deploying the first spool completely (or almost completely to allow for some overlap), begin deploying cabling from the second spool. The ACR may be configured to provide a locator at the spool change-over location. In embodiments, the locator may be a marking, a label (sticker), a GPS (or other location-based locator) identified location, e.g., overlaid over existing DCIM systems.

System Environment

Figure 15:
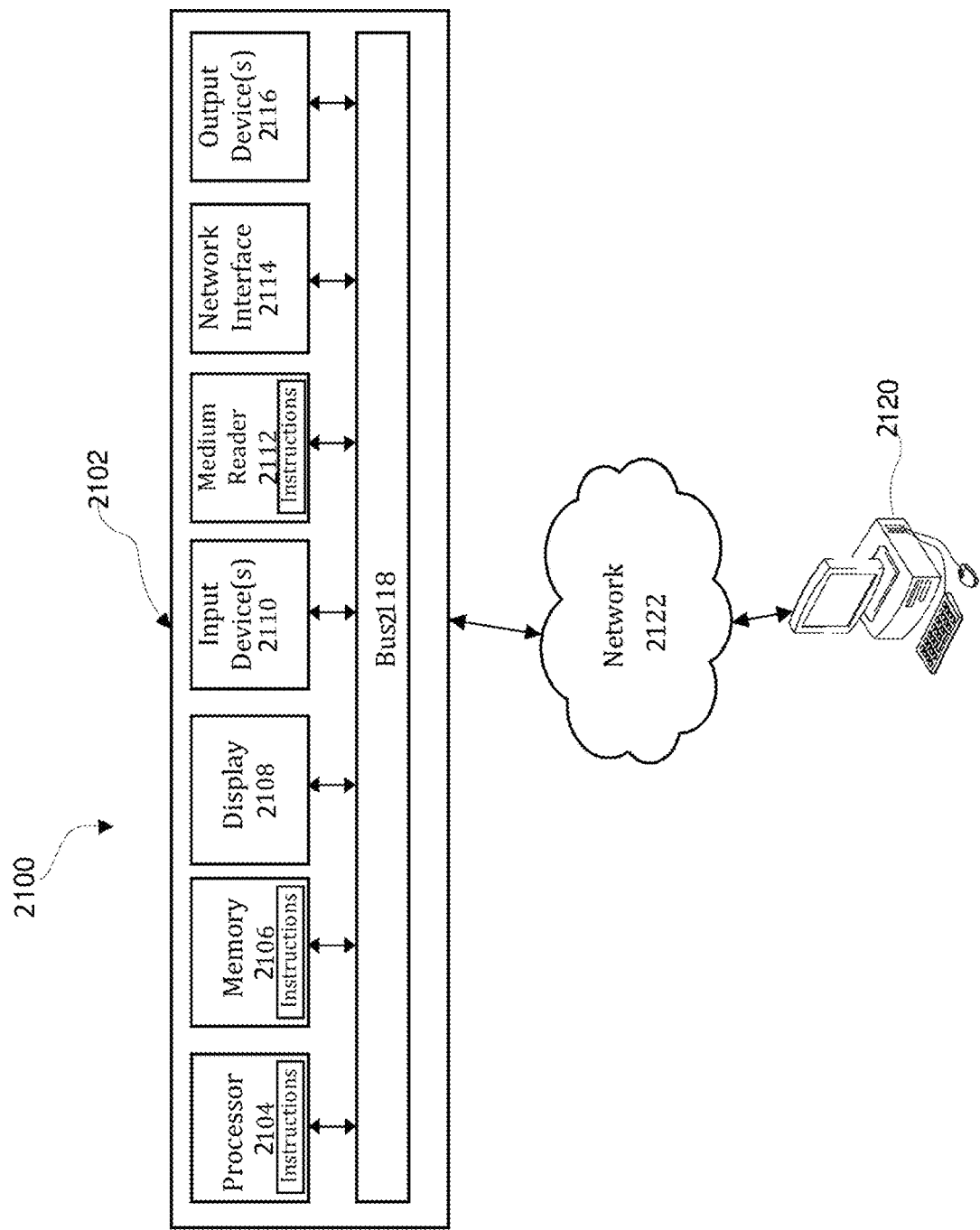
FIG. 15 is an exemplary system environment for use in accordance with the embodiments described herein.

FIG. 15 is an exemplary system for use in accordance with the embodiments described herein. The system 2100 is generally shown and may include a computer system 2102, which is generally indicated.

The computer system 2102 may include a set of instructions that can be executed to cause the computer system 2102 to perform any one or more of the methods or computer based functions disclosed herein, either alone or in combination with the other described devices. The computer system 2102 may operate as a standalone device or may be connected to other systems or peripheral devices. For example, the computer system 2102 may include, or be included within, any one or more computers, servers, systems, communication networks or cloud environment. Even further, the instructions may be operative in such cloud-based computing environment.

In a networked deployment, the computer system 2102 may operate in the capacity of a server or as a client user computer in a client-server user network environment, a client user computer in a cloud computing environment, or as a peer computer system in a peer-to-peer (or distributed) network environment. The computer system 2102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 2102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 15, the computer system 2102 may include at least one processor 2104. The processor 2104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 2104 is an article of manufacture and/or a machine component. The processor 2104 is configured to execute software instructions in order to perform functions as described in the various embodiments herein. The processor 2104 may be a general purpose processor or may be part of an application specific integrated circuit (ASIC). The processor 2104 may also be a microprocessor, a microcomputer, a processor chip, a controller, a microcontroller, a digital signal processor (DSP), a state machine, or a programmable logic device. The processor 2104 may also be a logical circuit, including a programmable gate array (PGA) such as a field programmable gate array (FPGA), or another type of circuit that includes discrete gate and/or transistor logic. The processor 2104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 2102 may also include a computer memory 2106. The computer memory 2106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 2106 may comprise any combination of memories or a single storage.

The computer system 2102 may further include a display 2108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 2102 may also include at least one input device 2110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 2110. Moreover, those skilled in the art further appreciate that the above-listed, exemplary input devices 2110 are not meant to be exhaustive and that the computer system 2102 may include any additional, or alternative, input devices 2110. In accordance with aspects of the disclosure, one or more of these input devices 2110 (e.g., GPS information) may be used as feed data used to control the ACR carriages and/or track switches.

The computer system 2102 may also include a medium reader 2112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 2106, the medium reader 2112, and/or the processor 2110 during execution by the computer system 2102.

Furthermore, the computer system 2102 may include any additional devices, components, parts, peripherals, hardware, software or any combination thereof which are commonly known and understood as being included with or within a computer system, such as, but not limited to, a network interface 2114 and an output device 2116. The output device 2116 may be, but is not limited to, a speaker, an audio out, a video out, a remote control output, a printer, or any combination thereof.

Each of the components of the computer system 2102 may be interconnected and communicate via a bus 2118 or other communication link. As shown in FIG. 15, the components may each be interconnected and communicate via an internal bus. However, those skilled in the art appreciate that any of the components may also be connected via an expansion bus. Moreover, the bus 2118 may enable communication via any standard or other specification commonly known and understood such as, but not limited to, peripheral component interconnect, peripheral component interconnect express, parallel advanced technology attachment, serial advanced technology attachment, etc.

The computer system 2102 may be in communication with one or more additional computer devices 2120 via a network 2122. The network 2122 may be, but is not limited to, a local area network, a wide area network, the Internet, a telephony network, a short-range network, or any other network commonly known and understood in the art. The short-range network may include, for example, Bluetooth. Zigbee, infrared, near field communication, ultraband, or any combination thereof. Those skilled in the art appreciate that additional networks 2122 which are known and understood may additionally or alternatively be used and that the exemplary networks 2122 are not limiting or exhaustive. Also, while the network 2122 is shown in FIG. 15 as a wireless network, those skilled in the art appreciate that the network 2122 may also be a wired network.

The additional computer device 2120 is shown in FIG. 15 as a personal computer. However, those skilled in the art appreciate that, in alternative embodiments of the present application, the computer device 2120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 2120 may be any additional device or apparatus commonly known and understood in the art without departing from the scope of the present application. For example, the computer device 2120 may be the same or similar to the computer system 2102. Furthermore, those skilled in the art similarly understand that the device may be any combination of devices and apparatuses.

Of course, those skilled in the art appreciate that the above-listed components of the computer system 2102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 16:
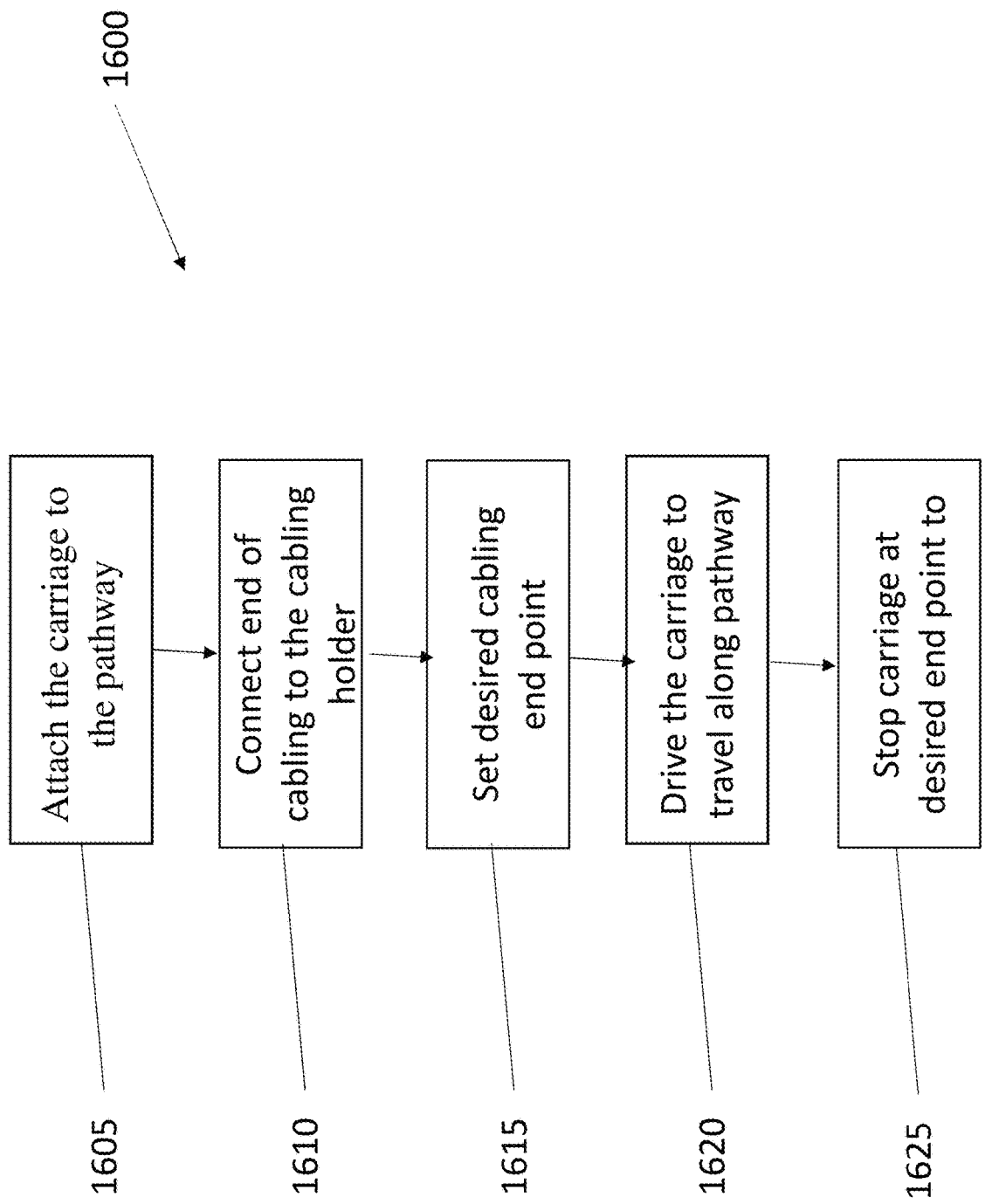
FIG. 16 depicts an exemplary algorithm for controlling an ACR in accordance with aspects of the embodiments described herein.

FIG. 16 depicts an exemplary algorithm 1600 for controlling an ACR for deploying a cabling in accordance with aspects of the embodiments described herein. As shown in FIG. 16, at step 1605, the carriage is attached to the pathway. At step 1610, the end of the cabling is attached to the carriage. At step 1615, a desired cabling end point is set. At step 1620, the carriage is driven from a start point to travel along the pathway. At step 1625, the carriage is stopped at the desired endpoint to deploy the cabling.

Exemplary embodiments may comprise a user interface that is configured to receive instruction from a user. Such embodiments may also comprise a processor in communication with the user interface and software instructions that configure the processor to perform the steps of the disclosure described herein.

While the present disclosure and associated inventive concepts have been illustrated by the description of various embodiments thereof, and while these embodiments have been described in considerable detail, it is not the intention of the Applicant to restrict or in any way limit the scope of any appended claims to such detail. Additional advantages and modifications will readily appear to those skilled in the art. Moreover, in some instances, elements described with one embodiment may be readily adapted for use with other embodiments. Therefore, the disclosure, in its broader aspects, is not limited to the specific details, the representative apparatus, and illustrative examples shown and described. Accordingly, departures may be made from such details without departing from the spirit or scope of the general inventive concepts.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the disclosure has been described with reference to particular examples, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An automated cable runner (ACR) for a cabling tray, the ACR comprising:
   a pathway;
   a carriage operable to travel along the pathway;
   a plurality of supports connectable to the pathway and connectable to the tray and configured to support the pathway over the tray; and
   a cable holder attached to the carriage,
   wherein the carriage is operable to autonomously travel along the pathway from a desired start point to a desired end point to deploy cabling into the tray from the start point to the end point.

2. The ACR of claim 1, further comprising an end stop attachable to the pathway at the desired end point to stop the travel of the carriage along the pathway.

3. The ACR of claim 1, wherein the carriage comprises:
   a drive wheel structured and arranged to contact the pathway;
   a motor operable to rotate the drive wheel; and
   a power source connected to the motor.

4. The ACR of claim 3, wherein the carriage additionally comprises one or more passive wheels structured and arranged to travel along the pathway.

5. The ACR of claim 3, wherein the carriage comprises:
   a main body;
   a fixed attachment arm extending from the main body on a first side of the main body;
   a movable attachment arm attached to the main body via a connection on a second side of the main body.

6. The ACR of claim 5, wherein the connection is a pivot connection, and the movable attachment arm is operable to pivot away from the main body to arrange the carriage in a pathway-connecting configuration.

7. The ACR of claim 5, wherein the connection is a releasable connection, and the movable attachment arm is removable from the main body to arrange the carriage in a pathway-connecting configuration.

8. The ACR of claim 5, wherein:
   the fixed attachment arm supports a first wheel,
   the movable attachment arm supports a second wheel, and
   the first wheel and the second wheel are operable to support the carriage and travel along the pathway.

9. The ACR of claim 8, wherein the pathway comprises respective grooves structured and arranged for receiving the first wheel and the second wheel, respectively.

10. The ACR of claim 8, wherein the pathway comprises an attachment slot operable to connect the plurality of supports to the pathway.

11. The ACR of claim 5, wherein the power source is supported by the movable attachment arm, and wherein the motor is supported by the main body.

12. The ACR of claim 4, wherein the drive wheel is structured and arranged to contact an underside of the pathway, and the passive wheels are structured and arranged to contact an upper side of the pathway.

13. The ACR of claim 1, wherein the carriage is structured and arranged to hang from the pathway and be disposed above the tray.

14. The ACR of claim 1, wherein the cable holder comprises at least one of a cable sock, a magnetic connection, and hook and loop fastener.

15. The ACR of claim 3, wherein the carriage comprises a switch operable to cut power to the motor upon actuation.

* * * * *